(12) United States Patent
Sasaki

(10) Patent No.: US 6,351,536 B1
(45) Date of Patent: Feb. 26, 2002

(54) ENCRYPTION NETWORK SYSTEM AND METHOD

(76) Inventor: Minoru Sasaki, c/o Pumpkin House Incorporated, Amenityhill-Honatsugi 717, 1620-1, Iiyama, Atsugi-shi, Kanagawa 243-0213 (JP)

( * ) Notice: Subject to any disclaimer, the term of this patent is extended or adjusted under 35 U.S.C. 154(b) by 0 days.

(21) Appl. No.: 09/161,746

(22) Filed: Sep. 29, 1998

(30) Foreign Application Priority Data

Oct. 1, 1997 (JP) .............................................. 9-283158

(51) Int. Cl.$^7$ ................................................. H04L 9/00
(52) U.S. Cl. ........................ 380/44; 380/255; 380/277; 380/278; 380/283; 713/150; 713/168
(58) Field of Search ................................ 380/255, 277, 380/278, 283, 44; 713/150, 168

(56) References Cited

U.S. PATENT DOCUMENTS 4,941,176 A * 7/1990 Matyas et al. ................. 380/21
6,075,864 A * 6/2000 Batten ......................... 380/255
6,141,750 A * 10/2000 Micali ......................... 713/168

* cited by examiner

Primary Examiner—Phung M. Chung
Assistant Examiner—Todd Jack
(74) Attorney, Agent, or Firm—McDermott, Will & Emery

(57) ABSTRACT

A key used for deciphering ciphertext is safely transmitted, to establish simple encryption communication. A transmitter and a receiver are connected through a network such that they can communicate with each other. In the transmitter, plaintext is enciphered using a common key. Ciphertext, together with a key generation program in a public-key cryptosystem, is transmitted from the transmitter to the receiver. In the receiver, a pair of a public key and a secret key is generated in accordance with the key generation program, the public key is transmitted to the transmitter, and the secret key is held in the receiver. In the transmitter, the common key is enciphered using the public key transmitted from the receiver. An enciphered common key transmitted to the receiver is deciphered using the held secret key. The ciphertext is deciphered using the deciphered common key.

30 Claims, 22 Drawing Sheets

*Fig. 15*

```
1:<html>
2:<head>
3:<title> Secret Service </title>
4:</head>
5:<body>
6:<!--#exec cgi="keygen"-->
7:<p>
8:Keep Your Information Safe!
9:<p>
10:<object id="Secret"
11:        classid="clsid:7253CB12-9CE0-11cf-0f34-0000E8A7440"
12:        codebase="http://www.xyz.co.jp/encode">
13:        <param name="Okey"ref value="Okey.sss">
14:        <param name="Data"value="file://c:/windows/box/Data.xxx">
15:        <param name="Sdata"value="file://c:/windows/box/Sdata.sss">
16:</object>
17:</body>
18:</html>
```

*Fig. 17*

```
 1: <html>
 2: <head>
 3: <title>Secret </title>
 4: </head>
 5: <body>
 6: <p>
 7: Your Message Will Be Transmitted Safely!
 8: <p>
 9: <form name="Text" action="/cgi-bin/formtofile. cgi" method="post">
10: <textarea name="Message" rows=20 cols=82>
11: Please Leave A Message
12: </textarea>
13: <p>
14: <input type="submit" name="Button" value="transmission">
15: <input type="hidden" name="Codedkey" value="0">
16: <input type="hidden" name="Sikibetusi" value="0">
17: <input type="hidden" name="userid" value="ccc@xyz. co. jp">
18: <input type="hidden" name="target" value="Sdata. ppp">
19: <input type="hidden" name="thankyou" value="http://www. xyz. co. jp">
20: </form>
21: <script Language="VBScript">
22: <!--
23:         sub Button_OnClick
24:             Dim TheData, Inpdata
25:                 set TheData=Document. Text
26:                     Inpdata=TheData. Message. Value
27:                 Encode. Data= Inpdata
28:             TheData. Message. value= Encode. Cdata
29:             .TheData. Codedkey. value= Encode. Ckey
30:             TheData. Sikibetusi. value= Encode. Mark
31:         end sub
32: -->
33: </script>
34: <object id="Encode"
35:         classid="clsid:8630FD87-9CE0-12AC-A6C7-00AA00A5DD3"
36:         codebase="http://www. xyz. co. jp/encode">
37:     <param name="Okey" refvalue="Okey. sss">
38:     <param name="Data" value=0>
39:     <param name="Cdata" value=0>
40:     <param name="Ckey" value=0>
41:     <param name="Mark" value=0>
42: </object>
43: </body>
44: </html>
``` ic method in an encryption (a cipher) network system, a device constituting the cipher network system, and a medium storing therein a program for controlling the device.

ENCRYPTION NETWORK SYSTEM AND METHOD

BACKGROUND OF THE INVENTION

1. Field of the Invention

The present invention relates to an enciphering method in an encryption (a cipher) network system, a device constituting the cipher network system, and a medium storing therein a program for controlling the device.

2. Description of the Related Art

A common-key cryptosystem and a public-key cryptosystem are known as a cryptosystem for enciphering plaintext and for deciphering ciphertext in encryption communication.

In the common-key cryptosystem, a key used for enciphering (encrypting) the plaintext and a key used for deciphering (decrypting) the ciphertext are identical.

In the public-key cryptosystem, the plaintext is enciphered using a public key, and the ciphertext is deciphered using a secret key paired with the public key used for the encryption.

In the common-key cryptosystem, the key used for enciphering the plaintext is also used for deciphering the ciphertext. Therefore, the same key as the key used for enciphering the plaintext must be previously delivered to a person who is authorized to decipher the ciphertext. In the public-key cryptosystem, a person who receives the ciphertext must previously put his or her own public key on a database or the like set in a network and disclose the public key. However, data in the database or the like set in the network is liable to be altered without authorization. It is said that a manager of the database must issue a certificate of the public key.

SUMMARY OF THE INVENTION

An object of the present invention is to provide an enciphering method in which encryption communication can be established safely and simply through a network utilized by a lot of persons, a device constituting a cipher network system, and a medium storing a program for controlling the device.

A cipher network system according to the present invention is constituted by a first device and a second device which are connected to each other by a network. The first device and the second device can communicate with each other through the network. In the system, ciphertext is transmitted from the first device to the second device through the network, and the ciphertext is deciphered in the second device.

The first device enciphers plaintext in accordance with an encryption program. Ciphertext thus obtained and its identifier are transmitted from the first device to the second device.

In the second device, in accordance with a first key generation program for generating a pair of a first public key and a first secret key in a first public-key cryptosystem, the pair of the first public key and the first secret key is generated, and the generated first secret key and its identifier are held. The generated first public key and its identifier are transmitted from the second device to the first device.

In the first device, information relating to the decryption of the ciphertext is enciphered using the received first public key. The enciphered information and the identifier are transmitted to the second device.

In the second device, the received enciphered information is deciphered using the first secret key, which corresponds to the received identifier, of the held first secret keys. The ciphertext is deciphered utilizing the deciphered information.

According to the present invention, the information relating to the decryption of the ciphertext is enciphered, and the enciphered information is transmitted from the first device to the second device. Moreover, the information relating to the decryption of the ciphertext is enciphered using the first public key cryptosystem. The first secret key for decryption in the first public key cryptosystem is generated in the second device, and is held in the second device. Since the first secret key is not transmitted on the network, the secrecy thereof is high, thereby making it possible to construct a cipher system that is significantly high in safety. Further, identifiers are respectively attached to the ciphertext and various keys, so that the correspondence between the ciphertext and the keys can be recognized by the identifiers. The present invention is particularly effective when a plurality of encrypted communications are transmitted on the network.

In one mode of the present invention, the information relating to the decryption of the ciphertext is a common key for enciphering plaintext to create the ciphertext. The plaintext is enciphered (ciphertext) using the common key in the first device, and is deciphered in the second device using the same common key as the common key used for the encryption.

In another mode of the present invention, the information relating to the decryption of the ciphertext is a secret key for plaintext corresponding to a public key for plaintext for enciphering plaintext to create the ciphertext. The plaintext is enciphered (ciphertext) using the public key for plaintext in the first device, and is deciphered in the second device using the secret key for plaintext corresponding to the public key for plaintext used for the encryption.

In still another mode, the information relating to the decryption of the ciphertext is a second secret key corresponding to a second public key in a second public key cryptosystem used for enciphering a common key for enciphering plaintext to create the ciphertext. In this case, the common key enciphered by the second public key is transmitted from the first device to the second device. In the second device, the received enciphered information is deciphered using the first secret key to obtain the second secret key, and the common key enciphered by the second public key is deciphered using the second secret key.

In a further mode, the information relating to the decryption of the ciphertext is a second secret key corresponding to a second public key in a second public key cryptosystem used for enciphering a secret key for plaintext corresponding to a public key for plaintext for enciphering plaintext to create the ciphertext. The secret key for plaintext that has been enciphered by the second public key is transmitted from the first device to the second device. In the second device, the received enciphered information is deciphered using the first secret key to obtain a second secret key, and the secret key for plaintext which has been enciphered by the second public key is deciphered using the second secret key.

When a first key generation program is put on the first device, and the program, together with the ciphertext and the identifier, is transmitted from the first device to the second device, the first key generation program need not be held in the second device.

Conversely, when a program for enciphering the plaintext, and a program for enciphering the information relating to the decryption of the ciphertext using the first public key are held in the second device, and the programs are transmitted to the first device by the second device (including a case where the first device accesses the second device), only a program for communication (for example, a web browser) may be provided in the first device.

It is possible to utilize an electronic mail and an internet in order to transmit the program and the ciphertext.

For example, at least one of transmission data including the ciphertext, the enciphered information and the identifier which are transmitted from the first device to the second device and transmission data including the first public key and the identifier which are transmitted from the second device to the first device is transmitted with it being stored in a file attached to an electronic mail.

An address, in a network, assigned to a file in the second device storing the program for enciphering the information relating to the decryption of the ciphertext using the first public key is described using the second device as a server on a web page provided therein. The first device accesses the second device to fetch the web page and further accesses the address, in the network, described on the web page to fetch the program.

The above-mentioned program can be also stored in the web page (JAVA applet, etc.). A program for calling the program from a device on the network (which may be the second device or the other device) may be stored (Plug-in, ActiveX, etc.).

The use of the following authenticating method for checking the second device makes it possible to prevent the other device from acquiring ciphertext without authorization. That is, the address, assigned to the second device, included in the transmission data including the first public key and the identifier which are transmitted from the second device to the first device is compared, in the first device, with an address, assigned to the second device, used when the ciphertext is transmitted from the first device to the second device, and the enciphered information and the identifier are transmitted from the first device to the second device only when the addresses coincide with each other.

In order to prevent the first public key transmitted on the network from being altered, an authenticator obtained by compressing the transmission data including the first public key and the identifier which are transmitted from the second device to the first device (including a part or the whole of a mail sentence in an electronic mail or a web page) and enciphering the compressed transmission data using the first secret key is created, and the authenticator and the transmission data are transmitted to the first device. In the first device, the transmission data is compressed, to check whether or not the compressed transmission data is the same as one which is obtained by deciphering the authenticator using the first public key.

The present invention further provides a method of reducing, when in a network system including a first device and a second device which are connected to each other by a network, enciphered information is generated in the first device and is transmitted to the second device, and the enciphered information is deciphered in the second device, the burden on the second device.

Specifically, the method of transmitting ciphertext from the first device to the second device which is connected to the first device by the network, and deciphering the ciphertext in the second device in the present invention is a method of transmitting a key generation program for generating a pair of a public key and a secret key in a public key cryptosystem, together with an identifier, from the first device to the second device, generating, in the second device, the pair of the public key and the secret key in accordance with the received key generation program, to hold the generated secret key in correspondence with the identifier, and transmit the generated public key, together with the identifier, to the first device, generating, in the first device, enciphered information using the received public key, to transmit the generated enciphered information, together with the identifier, to the second device, and deciphering, in the second device, the received enciphered information using the secret key, which corresponds to the received identifier, of the held secret keys.

In one mode, the enciphered information is ciphertext obtained by enciphering plaintext using the public key.

In another mode, the enciphered information is an enciphered key obtained by enciphering a common key used for creating ciphertext using the public key. In this case, the first device transmits the key generation program, together with the created ciphertext, to the second device.

Since the key generation program for generating the pair of the public key and the secret key in the public key cipher system is transmitted from the first device to the second device, the second device need not previously have the key generation program. Since a decryption program (also an encryption program) in the public key cryptosystem, for example, ActiveX or Plug-in is available from a web page on an internet, the second device need not hold the encryption program and the decryption program.

It is also possible to provide a third device in addition to the first and second devices, and to connect the first device, the second device and the third device to one another on a network system. In this configuration, the third device can manage the key generation program, the encryption program, and the decryption program, to reduce the burden on the first and second devices. In this case, in the first and second devices, the program transmitted from the third device is automatically eliminated (erased) after the execution thereof, thereby making it possible to further promote safety. A program for elimination is also transmitted from the third device to the first and second devices.

The present invention further provides first and second devices, and a medium storing a program for operating the first and second devices as described above.

BRIEF DESCRIPTION OF THE DRAWINGS

FIG. 15 illustrates the contents of an SHTML file;

FIG. 17 illustrates the contents of an HTML file;

DESCRIPTION OF THE PREFERRED EMBODIMENTS

First Embodiment

Figure 1:
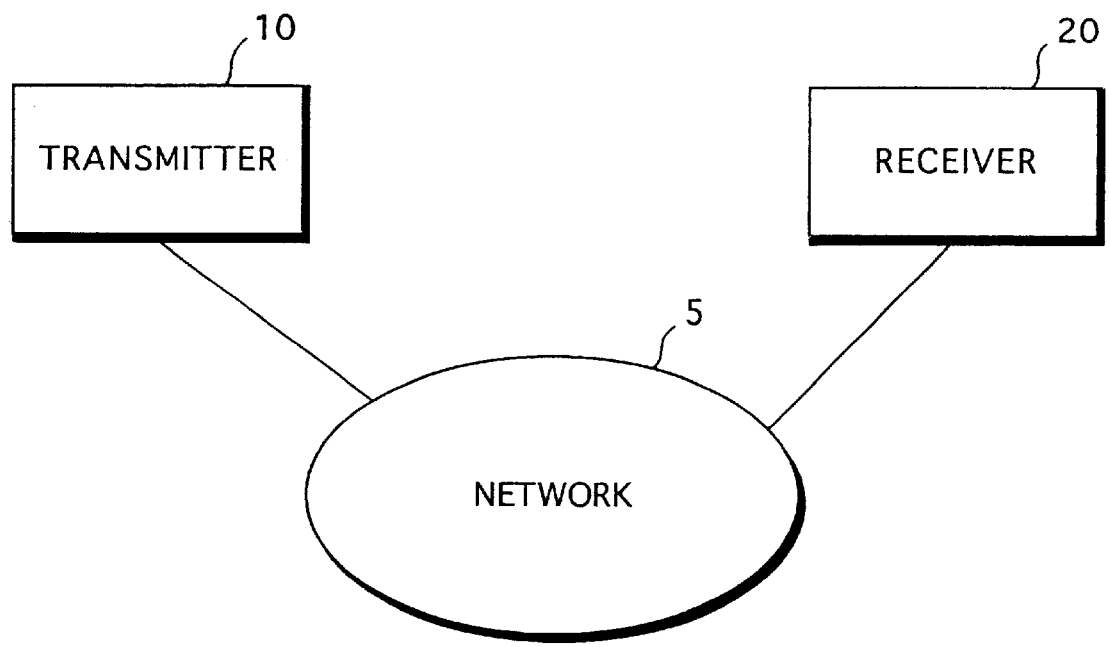
FIG. 1 illustrates the overall outline of a cipher network system.

FIG. 1 illustrates the overall configuration of a cipher network system.

In the cipher network system, a plurality of transmitters (transmitting devices or apparatuses) 10 and receivers (receiving devices or apparatuses) 20 are connected through a network 5 such that they can communicate with one another. The transmitter 10 and the receiver 20 are realized by a computer system, as described later. The computer system is referred to as a transmitter when it enciphers plaintext and transmits the enciphered plaintext, while being referred to as a receiver when it receives ciphertext transmitted from the transmitter and deciphers the received ciphertext. The transmitter and the receiver are names given for convenience of illustration by paying attention to their functions.

The network 5 is a public line network or a leased (or dedicated) line network that has existed or will be laid in the future. The transmitter 10 and the receiver 20 make data transmission using a communication protocol such as TCP/IP (Transmission Control Protocol/Internet Protocol) or HTTP (HyperText Transfer Protocol).

Figure 2:
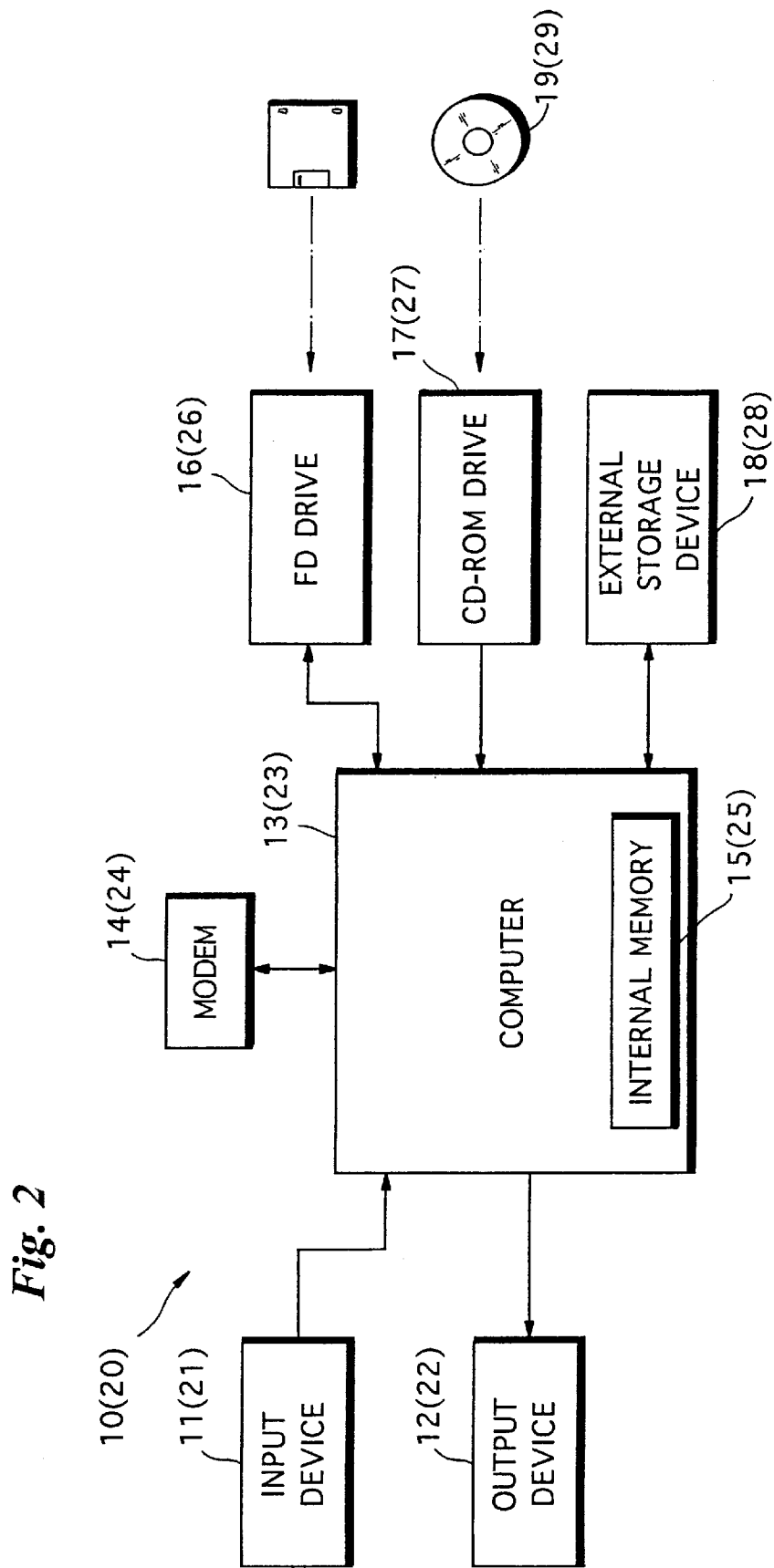
FIG. 2 is a block diagram showing the configuration of a transmitter.

FIG. 2 is a block diagram showing the configuration of the transmitter.

The transmitter 10 comprises a computer 13. Connected to the computer 13 through a bus are an input device 11 (a keyboard, a mouse, etc.) for accepting entry, an output device 12 (a CRT display device, a printer, etc.) for visibly outputting data, a modem 14 for making connection to the network 5, an FD drive 16 for reading data recorded on a floppy-disk (FD) and recording data on the FD, a CD-ROM drive 17 for reading data recorded on a CD-ROM 19, and an external storage device 18 (a hard disk device, etc.) storing an operating system. Inside the computer 13, there is provided an internal memory 15 for providing a program area storing programs to be executed by the computer, a work area for various operations, a buffer area, and so forth.

The receiver 20 basically has the same components as the transmitter 10. In FIG. 2, the components of the receiver 20 are respectively indicated by reference numerals in parentheses.

Figure 4:
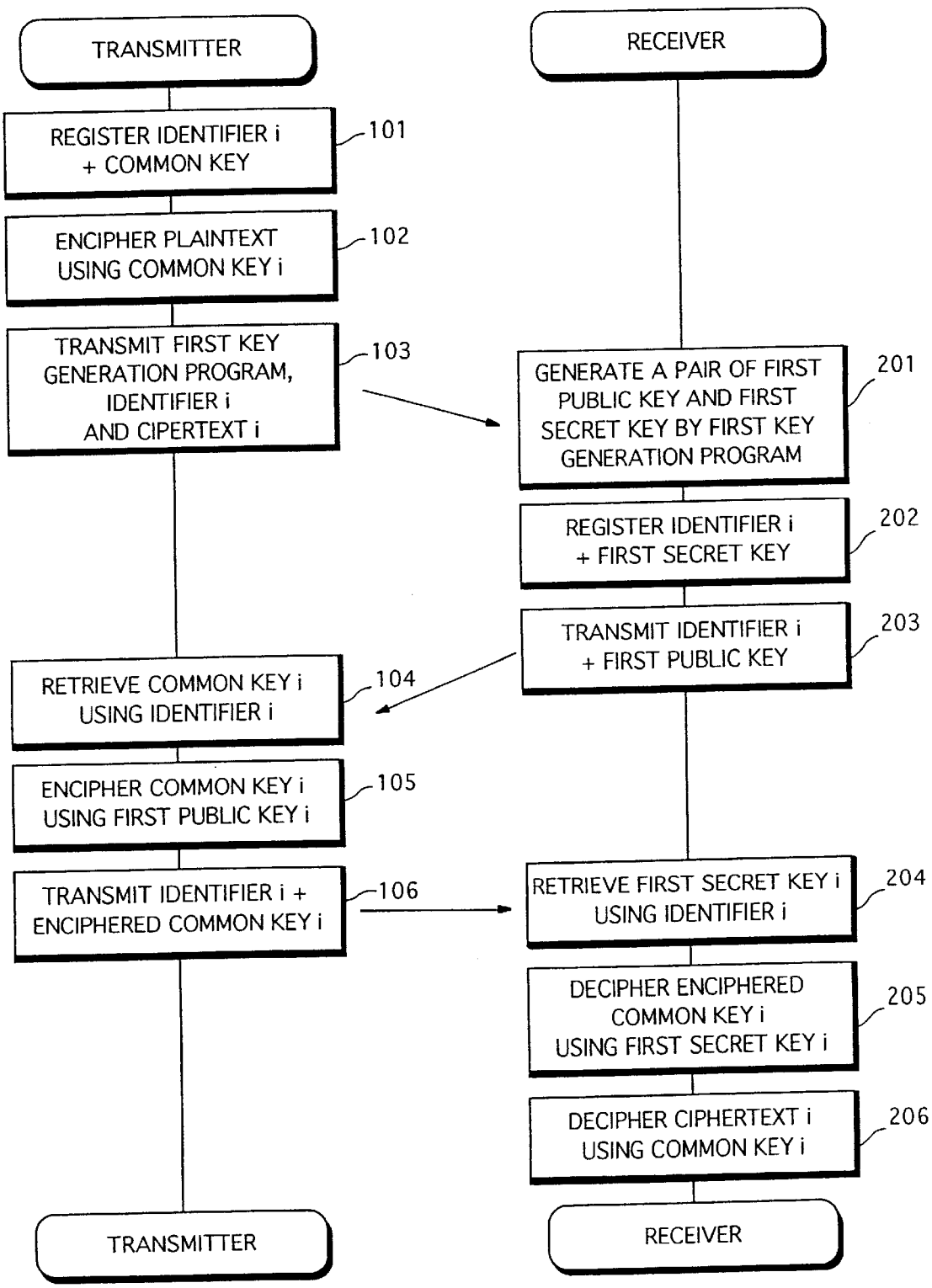
FIG. 4 is a flow chart showing the procedure for encryption processing and decryption processing in the first embodiment.

The transmitter 10 has programs for performing processing at the steps 101 to 106 shown on the left side of FIG. 4. The programs in the transmitter 10 include the following programs i) to iv):

i) an encryption program in a common-key cryptosystem (hereinafter referred to as a common key encryption program)

ii) a key generation program for generating a common key (hereinafter referred to as a common key generation program)

(this program may be included in the common key encryption program)

iii) a first encryption program in a public-key cryptosystem (hereinafter referred to as a first public key system encryption program)

iv) a first key generation program for generating a pair of a first public key and a first secret key (hereinafter referred to as a first public key/secret key generation program)

(this program iv) is not used in the transmitter 10, but is transmitted to the receiver 20 and used therein).

The receiver 20 has programs for performing processing at the steps 201 to 206 shown on the right side of FIG. 4. The programs in the receiver 20 include the following programs v) and vi):

v) a decryption program in a common-key cryptosystem (hereinafter referred to as a common key decryption program)

vi) a first decryption program in a public-key cryptosystem (hereinafter referred to as a first public key system decryption program) (this first public key system decryption program may, in some cases, be the same as the first public key system encryption program)

The programs (which include the programs i), ii), iii) and iv) but may not, in some cases, include the communication programs at the steps 103 and 106) of the transmitter 10 are recorded on the CD-ROM 19 (or the FD), and are distributed to an operator of the transmitter 10. The programs (which include the programs v) and vi) but may not, in some cases, include the transmission program at the step 203) of the receiver 20 are recorded on a CD-ROM 29 (or a FD), and are distributed to an operator of the receiver 20. The operator of the transmitter 10 loads the CD-ROM 19 in the CD-ROM drive 17. The operator of the receiver 20 loads the CD-ROM 29 in a CD-ROM drive 27. The program recorded on the CD-ROM 19 (29) is directly read in the computer 13 (23) from the CD-ROM drive 17 (27), or is installed in the external storage device 18 (28) from the CD-ROM drive 17 (27) and is read in the computer 13 (23) from the external storage device 18 (28), so that processing shown in FIG. 4 as described in detail below is performed.

Figure 3:
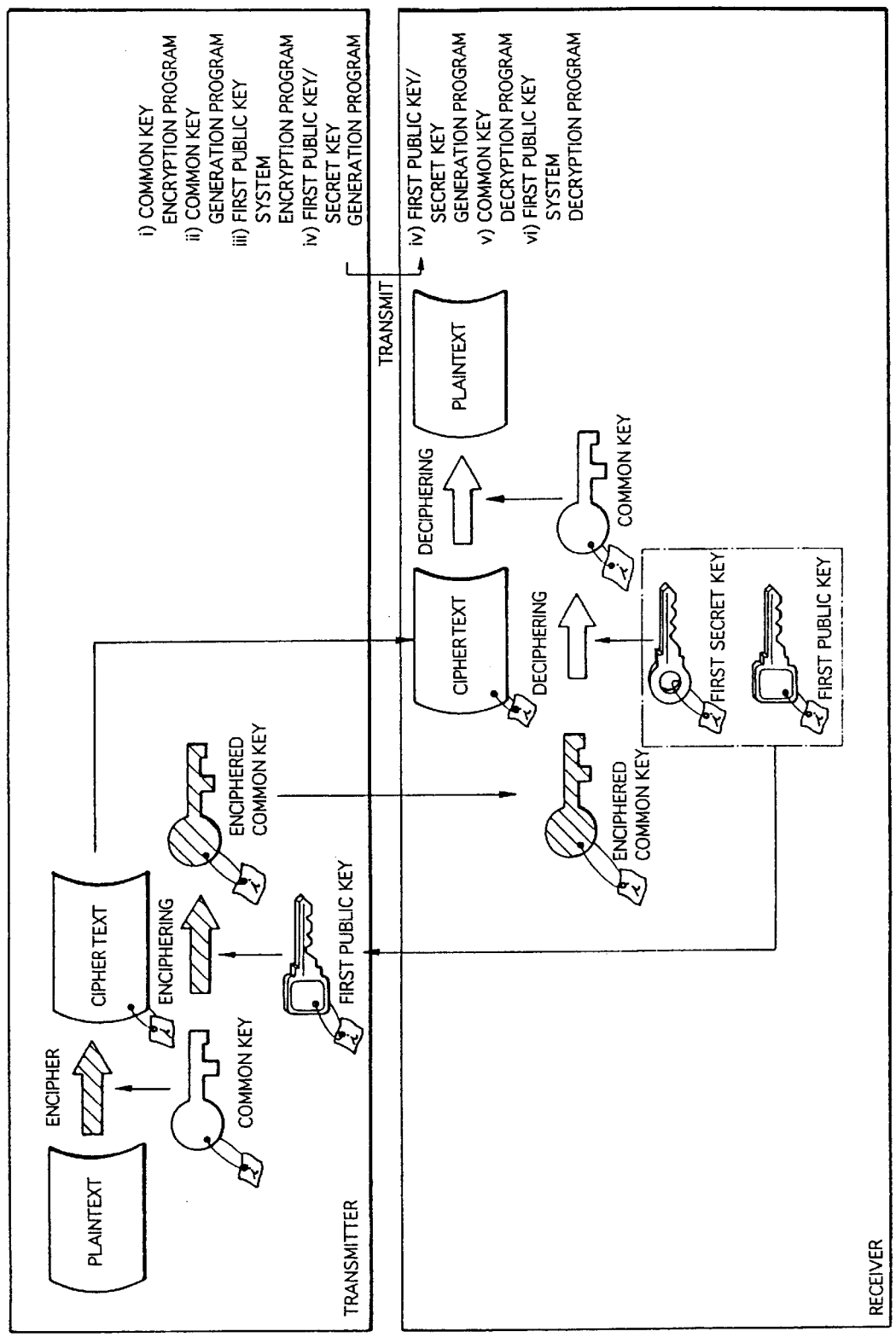
FIG. 3 illustrates the outline of encryption/decryption processing in a first embodiment.

FIG. 3 illustrates the outline of encryption processing and decryption processing which are respectively executed by the transmitter 10 and the receiver 20, centered around the roles of keys. FIG. 4 is a flow chart showing the procedure for encryption processing in the transmitter 10, decryption processing in the receiver 20, and communication processing between the transmitter 10 and the receiver 10.

In the transmitter 10, the operator first enters plaintext from the input device 11, or plaintext is automatically created in the transmitter 10 (including a case where plaintext created in the other computer is received by the transmitter 10 (on read from the FD, etc.)). The plaintext is not limited to document data. For example, it includes a credit card number, a password, and so forth in electronic commerce (EC). The entered plaintext is temporarily stored in the internal memory 15 in the transmitter 10.

A common key is generated in accordance with a common key generation program. For example, a random number generation program is used as the common key generation program, to generate a random number and take the random number as a common key.

The generated common key is registered (stored) in the external storage device 18 in correspondence with an identifier (step 101). The identifier is indicated by i, and a common key corresponding to the identifier i is taken as a common key i. The identifier is used for identifying a key used in processing in the cipher network system. This is effective for a case where a plurality of types of ciphertext are transmitted and received between the transmitter 10 and the receiver 20 or between the transmitter 10 or the receiver 20 and the other device. Used as the identifier i are a number which is increased or changed every time the common key is generated (for example, a random number generated every time the common key is generated), a character or a number which is entered by the operator, and so forth. A plurality of common keys may be previously generated and stored in the external storage device 18 so that the identifier i corresponds to one of the stored common keys every time the identifier i is generated or entered.

The plaintext is then enciphered using the common key i in accordance with the common key encryption program (step 102) (ciphertext thus created is taken as ciphertext i). The ciphertext i, together with the identifier i and the first public key/secret key generation program, is transmitted from the transmitter 10 to the receiver 20 (step 103).

The receiver 20 executes, when it receives the ciphertext i, the identifier i and the first public key/secret key generation program which are transmitted from the transmitter 10, the received first public key/secret key generation program. Consequently, a pair of the first public key and the first secret key is generated (step 201).

The first secret key in the generated pair of the first public key and the first secret is registered (stored) in the external storage device 28 of the receiver 20 in correspondence with the identifier i (step 202). On the other hand, the first public key, together with the identifier i, is transmitted to the transmitter 10 (step 203). The first secret key and the first public key which correspond to the identifiers i are respectively taken as a first secret key i and a first public key i.

The transmitter 10 which has received the first public key i and the identifier i retrieves a common key i, which corresponds to the received identifier i, of the common keys registered in the external storage device 18 (step 104).

The retrieved common key i is enciphered using the first public key i transmitted from the receiver 20 in accordance with a first public key system encryption program (step 105). The enciphered common key (hereinafter referred to as the enciphered common key i), together with the identifier i, is transmitted to the receiver 20 (step 106).

The receiver 20 retrieves the first secret key i, which corresponds to the identifier i, of the first secret keys that have been registered in the external storage device 28 (step 204). The retrieved first secret key i is one which is paired with the first public key i used for enciphering the common key i (step 105).

In the receiver 20, the enciphered common key i transmitted from the transmitter 10 is deciphered using the retrieved first secret key i in accordance with the first public key system decryption program (step 205), to obtain a common key i. The ciphertext which has been previously received is then deciphered using the deciphered common key i in accordance with a common key decryption program (step 206). Plaintext is thus obtained.

Keys transmitted through the network 10 are only the enciphered common key i and the first public key i. The first secret key i that is required to have high secrecy is not transmitted. Further, in the receiving side, the first secret key need not be previously acquired, but a pair of the first public key and the first secret key is generated every time the ciphertext is received. Therefore, it is significantly difficult for a third person to decipher the ciphertext, so that the safety of the encryption communication is high. Further, the correspondence of the identifier i with the enciphered common key, the first public key and the first secret key makes it possible to specify, when the first public key i is transmitted from the receiver 20 to the transmitter 10, the common key to be enciphered using the received first public key in the transmitter 10, and to specify, when the enciphered common key i is transmitted from the transmitter 10 to the receiver 20, the first secret key and the enciphered common key which are to be used for decryption processing in the receiver 20. Even when a lot of types of ciphertext are transmitted and received, the encryption processing and the decryption processing can be performed without error.

Although the first public key/secret key generation program (step 103) and the enciphered common key (step 106) are transmitted from the transmitter 10 to the receiver 20, the receiver 20 may access to the transmitter 10 and the first public key/secret key generation program and the enciphered common key may be downloaded. The operator of the receiver 20 can specify the enciphered common key to be downloaded on the basis of the identifier i assigned to the ciphertext. Alternatively, the first public key/secret key generation program and the enciphered common key can be also stored in an accessible database, put on a computer, other than the transmitter 10, and acquired by access to the database from the receiver 20. Further, the first public key/secret key generation program may be provided in the receiver 20 in advance.

In the above-mentioned first embodiment, the common key i is used to encipher the plaintext and to decipher the ciphertext. Alternatively, it is also possible to encipher the plaintext using a public key in a public key system, and to decipher the ciphertext using a secret key corresponding thereto (the keys are respectively referred to as a public key for plaintext and a secret key for plaintext (this modification is also applied to the second to thirteenth embodiments described later). In this case, a pair of the public key for plaintext and the secret key for plaintext is generated, and the generated secret key for plaintext, together with an identifier i, is registered in the external storage device 18 (corresponding to the step 101). The plaintext is enciphered in the transmitter 10 using the public key for plaintext (which shall be a public key i for plaintext) corresponding to the secret key for plaintext (which shall be a secret key i for plaintext) (corresponding to the step 102). In the transmitter 10, the secret key i for plaintext is enciphered using the first public key i transmitted from the receiver 20, and the enciphered secret key i for plaintext, together with an identifier i, is transmitted to the receiver 20 (corresponding to the steps 104 to 106). In the receiver 20, the enciphered secret key i for plaintext is deciphered using the first secret key i, and the ciphertext is deciphered to obtain plaintext using the deciphered secret key i for plaintext (corresponding to the steps 204 to 206).

When the plaintext is enciphered using the public key (the public key for plaintext), an encryption program (also a decryption program) utilizing an elliptical cryptosystem (algorithm) may be used. It is possible to encipher plaintext at high speed, and reduce the amount of use of a memory in the computer.

Second Embodiment

The second embodiment differs from the first embodiment in the types of programs which each of a transmitter 10 and a receiver 20 has and an operation performed thereby. That is, i) a common key encryption program, iii) a first public key system encryption program, and iv) a first public key/secret key generation program excluding ii) a common key generation program out of the programs i), ii), iii) and iv) which are provided in the transmitter 10 in the first embodiment are provided in the receiver 20.

Figure 5:
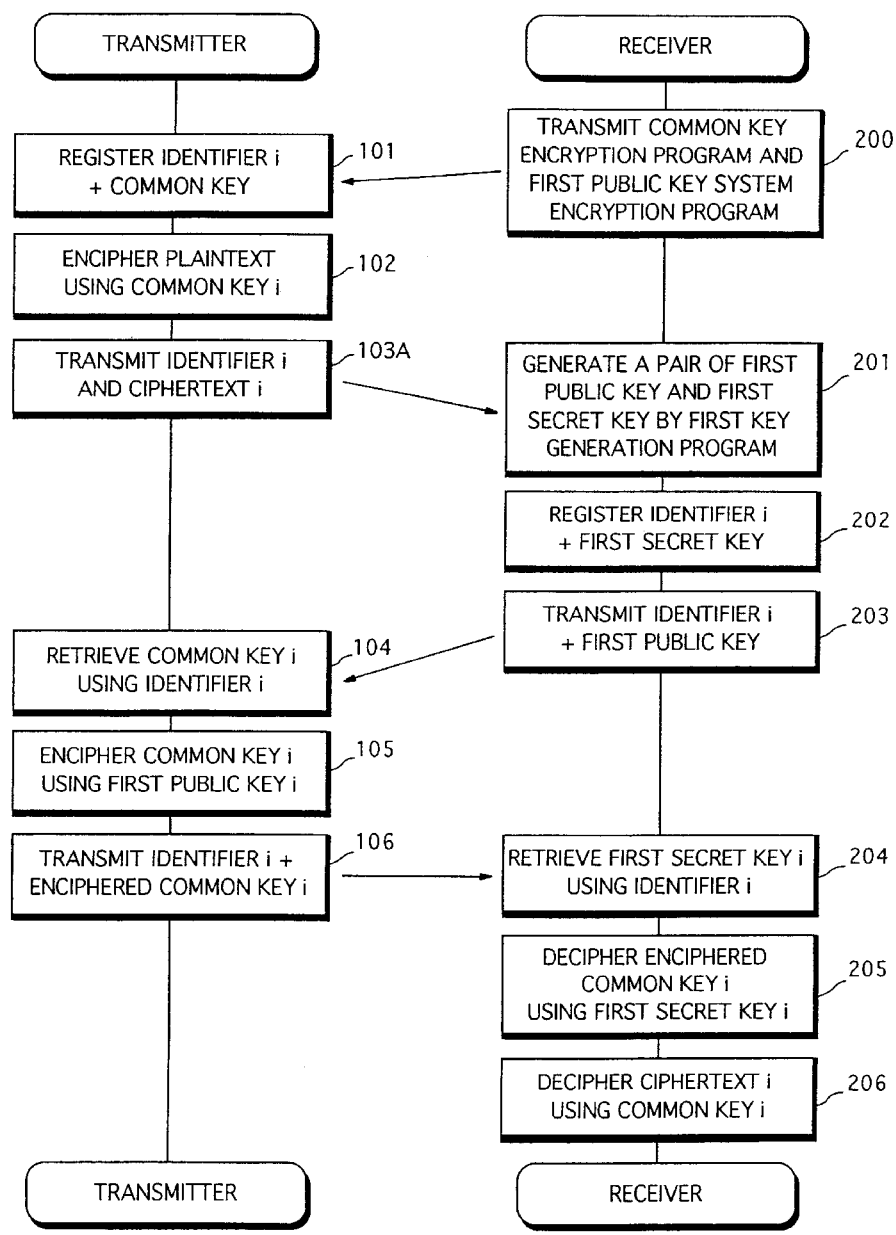
FIG. 5 is a flow chart showing the procedure for encryption processing and decryption processing in a second embodiment.

FIG. 5 is a flow chart showing the procedure for encryption processing in the transmitter 10 in the second embodiment, decryption processing in the receiver 20 in the second embodiment, and communication processing between the transmitter 10 and the receiver 20. Processing excluding processing at the steps 200 and 103A is the same as that in the first embodiment (FIG. 4) and hence, the description thereof is not repeated.

When a request to transmit the common key encryption program and the first public key system encryption program is issued from the transmitter 10, or when the receiver 20 requests to transmit ciphertext from the transmitter 10, the receiver 20 transmits to the transmitter 10 the common key encryption program and the first public key system encryption program (step 200).

In the transmitter 10, plaintext is enciphered using a common key i in accordance with the common key encryption program (step 102). Ciphertext i and an identifier i are transmitted from the transmitter 10 to the receiver 20 (step 103A). Processing at the steps 201 to 203, the steps 104 to 106, and the steps 204 to 206 (which is the same as that shown in FIG. 4) is performed, so that the ciphertext transmitted to the receiver 20 is deciphered to be plaintext.

In the second embodiment, even when the transmitter 10 does not have the common key encryption program and the first public key system encryption program, it is possible to establish the same encryption communication as that in the first embodiment and to ensure security.

Third Embodiment

The third embodiment compares, in a transmitter 10, an IP (Internet Protocol) address assigned to an operator of a receiver 20 which an operator of a transmitter 10 previously knows with an IP address included in data transmitted from the receiver 20 to the transmitter 10, to prevent an unauthorized person from pretending to be authorized.

The configuration of a network is the same as that shown in FIG. 1, and the transmitter (the receiver) in the first embodiment (FIG. 2) can be used as the transmitter 10 (the receiver 20). The third embodiment will be described on the premise that TCP/IP is used as a communication protocol between the transmitter 10 and the receiver 20.

Programs that the transmitter 10 has and programs that the receiver 20 has are the same as those in the first embodiment.

Figure 6:
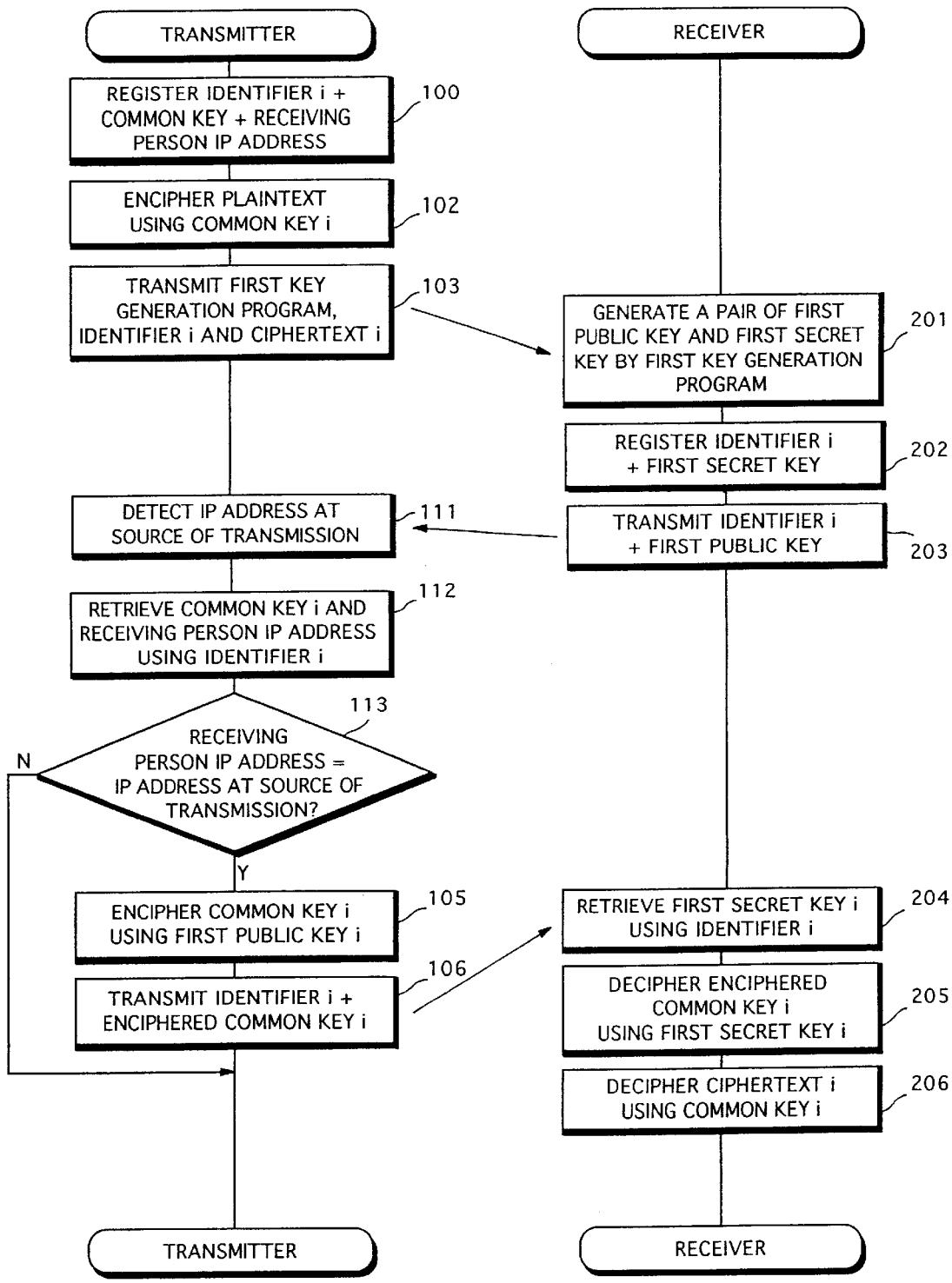
FIG. 6 is a flow chart showing the procedure for encryption processing and decryption processing in a third embodiment.

FIG. 6 is a flow chart showing the procedure for encryption processing in the transmitter 10, decryption processing in the receiver 20, and communication processing between the transmitter 10 and the receiver 20. Processing at the steps 102, 103, 105 and 106 in the transmitter 10 and processing at the steps 201 to 206 in the receiver 20 are the same as those in the first embodiment (FIG. 4) and hence, the description thereof is not repeated.

In the transmitter 10, the IP address assigned to the operator of the receiver 20 to which ciphertext is transmitted (hereinafter referred to as a receiving person IP address) is entered, or is set in advance.

A common key is generated in accordance with a common key generation program. The generated common key and the entered (or set in advance) receiving person IP address are registered in an external storage device 18 in correspondence with an identifier i (step 100).

After plaintext is enciphered (step 102), ciphertext i, the identifier i and a first public key/secret key generation program are transmitted to the receiver 20 in accordance with the receiving person IP address (step 103).

In the receiver 20, a pair of a first public key and a first secret key is generated(step 201), and the first public key i, together with the identifier i, is transmitted to the transmitter 10 (step 203).

In data transmission based on TCP/IP, an IP address at the source of transmission is attached to (accompanies) data to be transmitted in addition to an IP address at the destination of transmission. That is, the IP address at the source of transmission (the IP address assigned to the operator of the receiver 20) is attached to transmitted data (the first public key i and the identifier i) which is transmitted from the receiver 20 to the transmitter 10. The transmitter 10 detects, when it receives the first public key i and the identifier i which are transmitted from the receiver 20, the IP address at the source of transmission which is attached thereto (step 111).

The transmitter 10 then retrieves the common key i and the receiving person IP address which correspond to the received identifier i out of common keys and receiving person IP addresses which are registered in the external storage device 18 (step 112).

In the transmitter 10, the receiving person IP address which is retrieved at the step 112 and the IP address at the source of transmission which is detected at the step 111 are compared with each other (step 113). When the two IP addresses coincide with each other (YES at step 113), the common key i retrieved at the step 112 is enciphered using the first public key i transmitted from the receiver 20 in accordance with a first public key system encryption program (step 105). The enciphered common key i, together with the identifier i, is transmitted to the receiver 20 (step 106). In the receiver 20, the decryption processing (the steps 204 to 206) is performed, so that the ciphertext i which has been transmitted is deciphered to obtain plaintext.

When the IP address at the source of transmission which has been detected at the step 111 differs from the receiving person IP address (NO at step 113), the transmitter 10 does not encipher the common key i (step 105), and does not transmit the enciphered common key i and the identifier i to the receiver 20 (step 106). Consequently, in the receiver 20, ciphertext i cannot be deciphered.

Consider a case where a person who acquires the ciphertext transmitted from the transmitter 10 to the receiver 20 without authorization transmits the first public key i and the identifier i to the transmitter 10, pretending to be the operator of the receiver 20. In this case, if such an unauthorized transmitting person uses an IP address assigned to himself or herself (uses an own registered name (an account) in internet), the IP address at the source of transmission differs from the receiving person IP address. In the third embodiment, the ciphertext is prevented from being deciphered by an unauthorized person by canceling the transmission of the enciphered common key i and the identifier i to that person.

Fourth Embodiment

Figure 7:
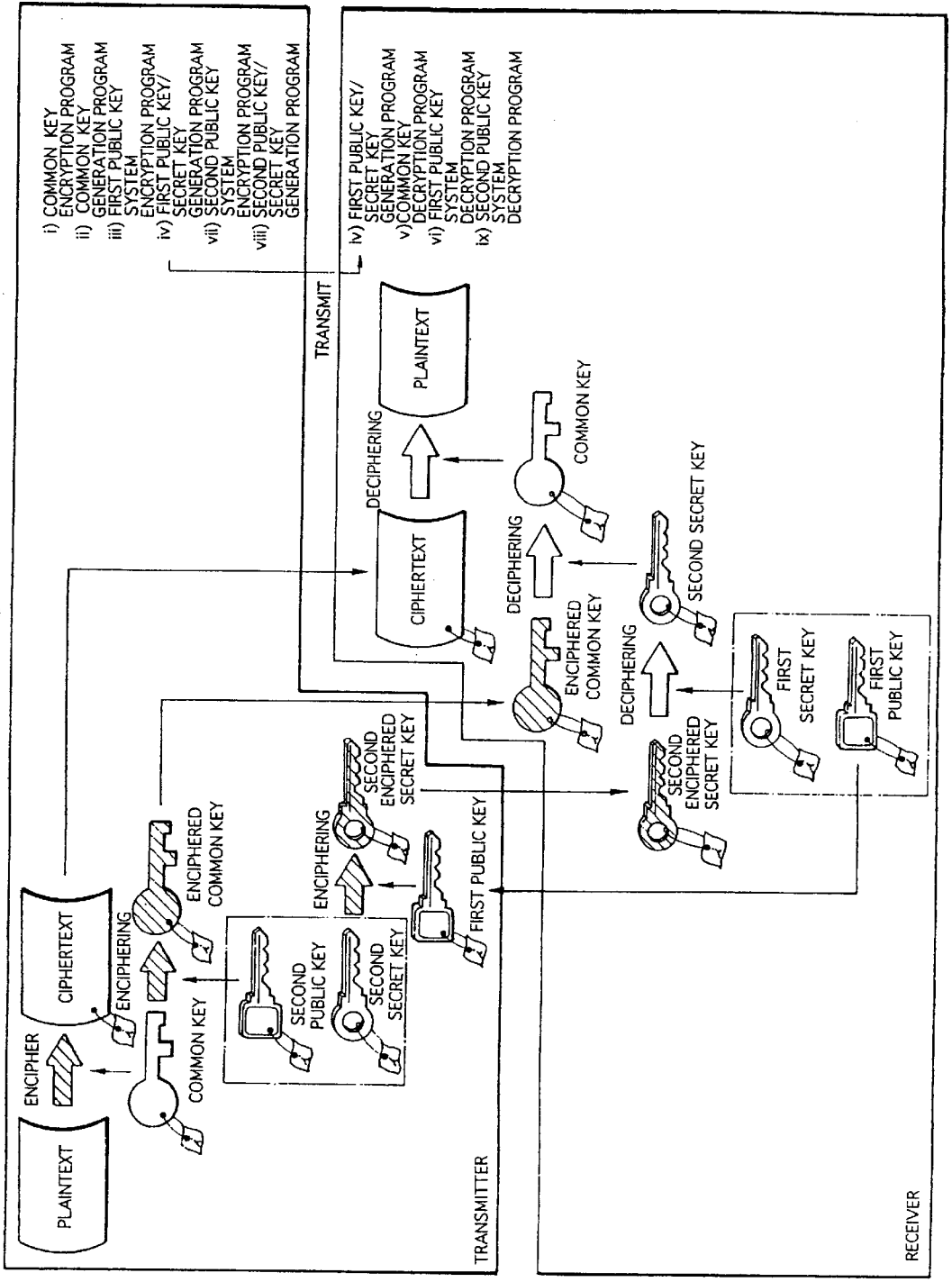
FIG. 7 illustrates the outline of encryption/decryption processing in a fourth embodiment.

FIG. 7 illustrates the roles of various types of keys in the fourth embodiment. In the fourth embodiment, a second public key and a second secret key are used in addition to the common key, the first public key and the first secret key in the first embodiment. The overall configuration of a cipher network system and the configuration of a transmitter 10 (and a receiver 20) are the same as those in the first embodiment (FIGS. 1 and 2).

Figure 8:
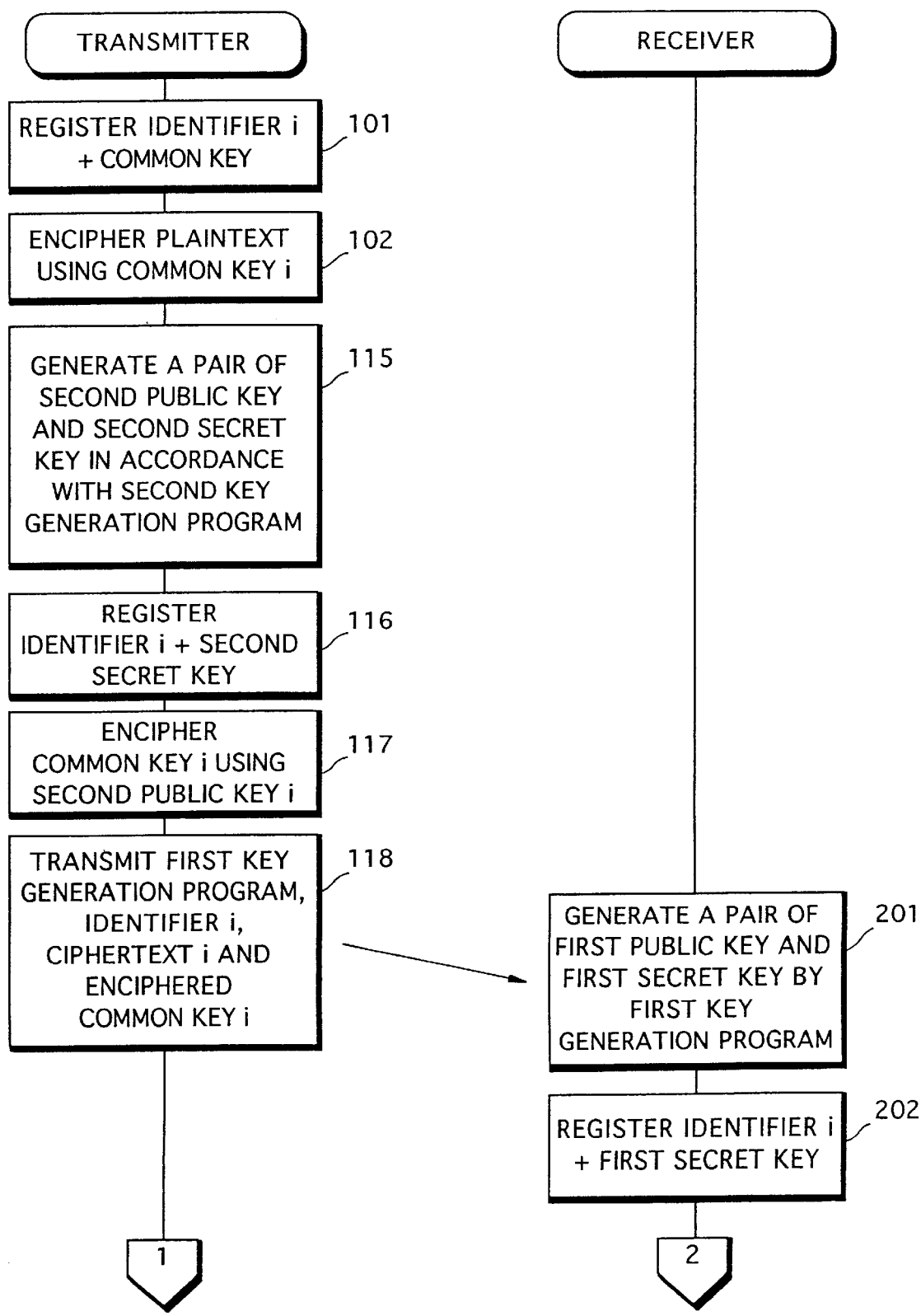
FIGS. 8 and 9 are flow charts showing encryption processing and decryption processing in the fourth embodiment.
Figure 9:
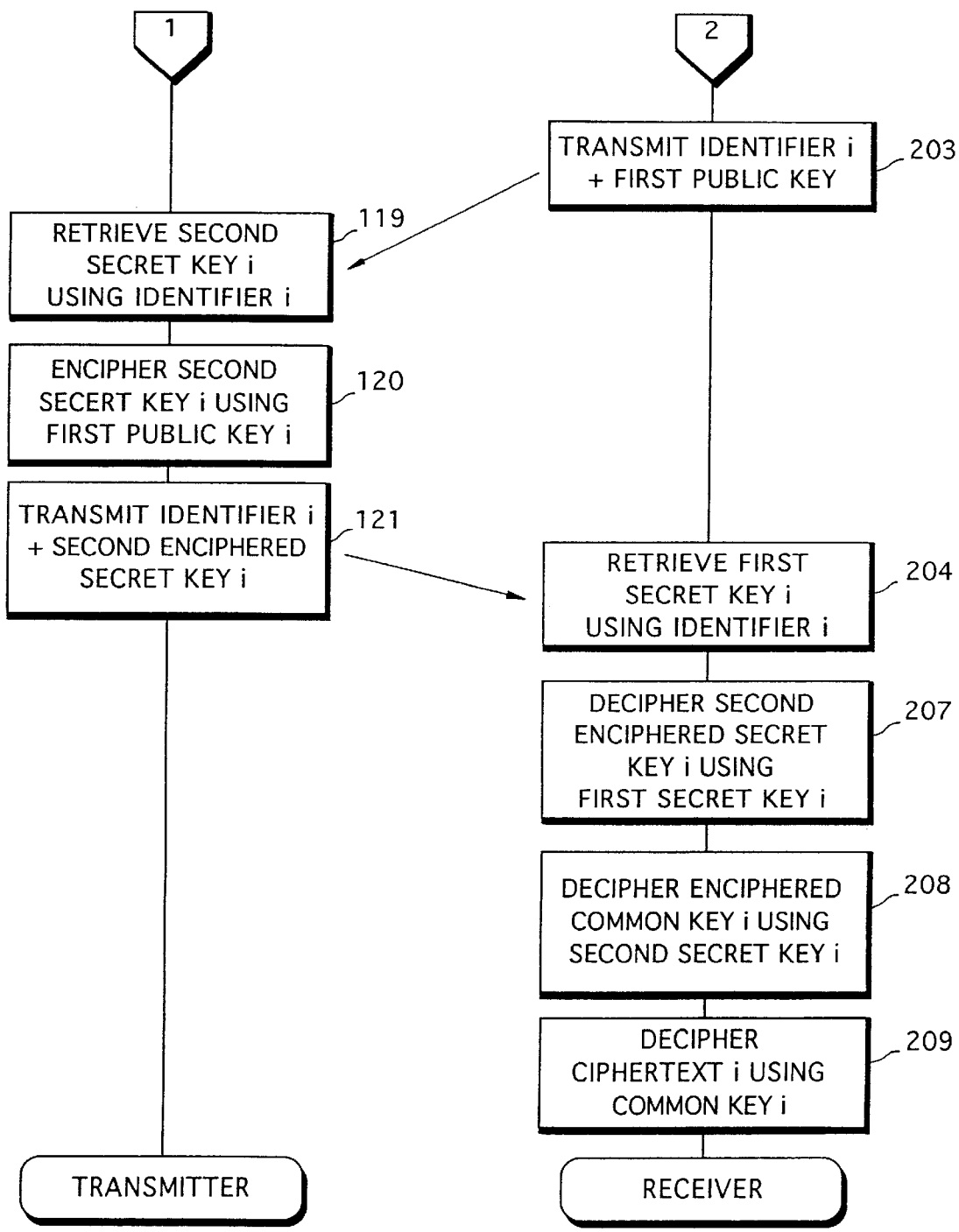

The transmitter 10 has programs for performing processing in flow charts on the left side of FIGS. 8 and 9, and the programs include the following programs vii) and viii) in addition to the foregoing programs i), ii), iii) and iv):

vii) a second encryption program in a public-key cryptosystem (hereinafter referred to as a second public key system encryption program) (the first public key system encryption program and the second public key system encryption program may be the same)

viii) a second key generation program for generating a pair of a second public key and a second secret key (hereinafter referred to as a second public key/secret key generation program)

The receiver 20 has programs for performing processing in flow charts on the right side of FIGS. 8 and 9, and the programs include the following program ix) in addition to the foregoing programs v) and vi)

ix) a second decryption program in a public-key cryptosystem (hereinafter referred to as a second public key system decryption program) (the first public key system decryption program and the second public key system decryption program may be the same).

FIGS. 8 and 9 are flow charts showing the procedure for encryption processing in the transmitter 10, decryption processing in the receiver 20, and communication processing between the transmitter 10 and the receiver 20. Processing at the steps 101 and 102 in the transmitter 10 and processing at the steps 201 to 204 in the receiver 20 are the same as those in the first embodiment (FIG. 4) and hence, the description thereof is not repeated.

Plaintext is enciphered using a common key i (step 102), after which a pair of a second public key and a second secret key is generated in accordance with a second public key/secret key generation program in the transmitter 10 (step 115) (they shall be a second public key i and a second secret key i). The second secret key i in the pair of the second public key i and the second secret key i which have been generated is registered (stored) in an external storage device 18 of the transmitter 10 in correspondence with an identifier i (step 116).

On the other hand, the second public key i is used for enciphering the common key i which has been used for enciphering the plaintext (step 102). That is, the common key i is enciphered using the second public key i in accordance with the second public key system encryption program (step 117). The common key i enciphered using the second public key i (the enciphered common key i), together with the ciphertext i, the identifier i and the first public key/secret key generation program, is transmitted to the receiver 20 (step 118).

The receiver 20 executes, when it receives the enciphered common key i, the ciphertext i, the identifier i and the first public key/secret key generation program which have been transmitted from the transmitter 10, the received first public key/secret key generation program. Processing at the steps 201 to 203 (which is the same as that in the first embodiment) is performed, so that the generated first secret key i is registered (stored) in the external storage device 28 in the receiver 20 in correspondence with the identifier i, and the generated first public key i, together with the identifier i, is transmitted to the transmitter 10.

The transmitter 10 which has received the first public key i and the identifier i retrieves the second secret key i, which corresponds to the received identifier i, of the second secret keys registered in the external storage device 28 (step 119). The retrieved second secret key i is one which is paired with the second public key i used for enciphering the common key i (step 117).

In the transmitter 10, the retrieved second secret key i is enciphered (this is referred to as a second enciphered secret key i) using the first public key i transmitted from the receiver 20 in accordance with a first public key system encryption program (step 120). The second enciphered secret key i, together with the identifier i, is transmitted to the receiver 20 (step 121).

The receiver 20 retrieves the first secret key i, which corresponds to the received identifier i, of the first secret keys that have been registered in the external storage device 28 (step 204). The retrieved first secret key i is one which is paired with the first public key i used for enciphering the second secret key i (step 120).

In the receiver 20, the second enciphered secret key i transmitted from the transmitter 10 is deciphered using the retrieved first secret key i in accordance with the first public key system decryption program (step 207). The enciphered common key is then deciphered using the deciphered second secret key i in accordance with the second public key system decryption program (step 208). Finally, the ciphertext i that has been received is deciphered using the deciphered common key i in accordance with the common key decryption program (step 209). Plaintext is thus obtained.

Fifth Embodiment

The fifth embodiment has, in addition to a mode of transmitting ciphertext (hereinafter referred to as first ciphertext) from a transmitter 10 to a receiver 20 and decipher the first ciphertext in the receiver 20 (the first to fourth embodiments), a mode of transmitting another ciphertext (hereinafter referred to as second ciphertext) from the receiver 20 to the transmitter 10 and decipher the second ciphertext in the transmitter 10, that is, establishes bidirectional encryption communication. The configuration of a network is the same as that shown in FIG. 1, and the transmitter 10 (the receiver 20) in the first embodiment (FIG. 2) can be used as the transmitter (the receiver).

Figure 10:
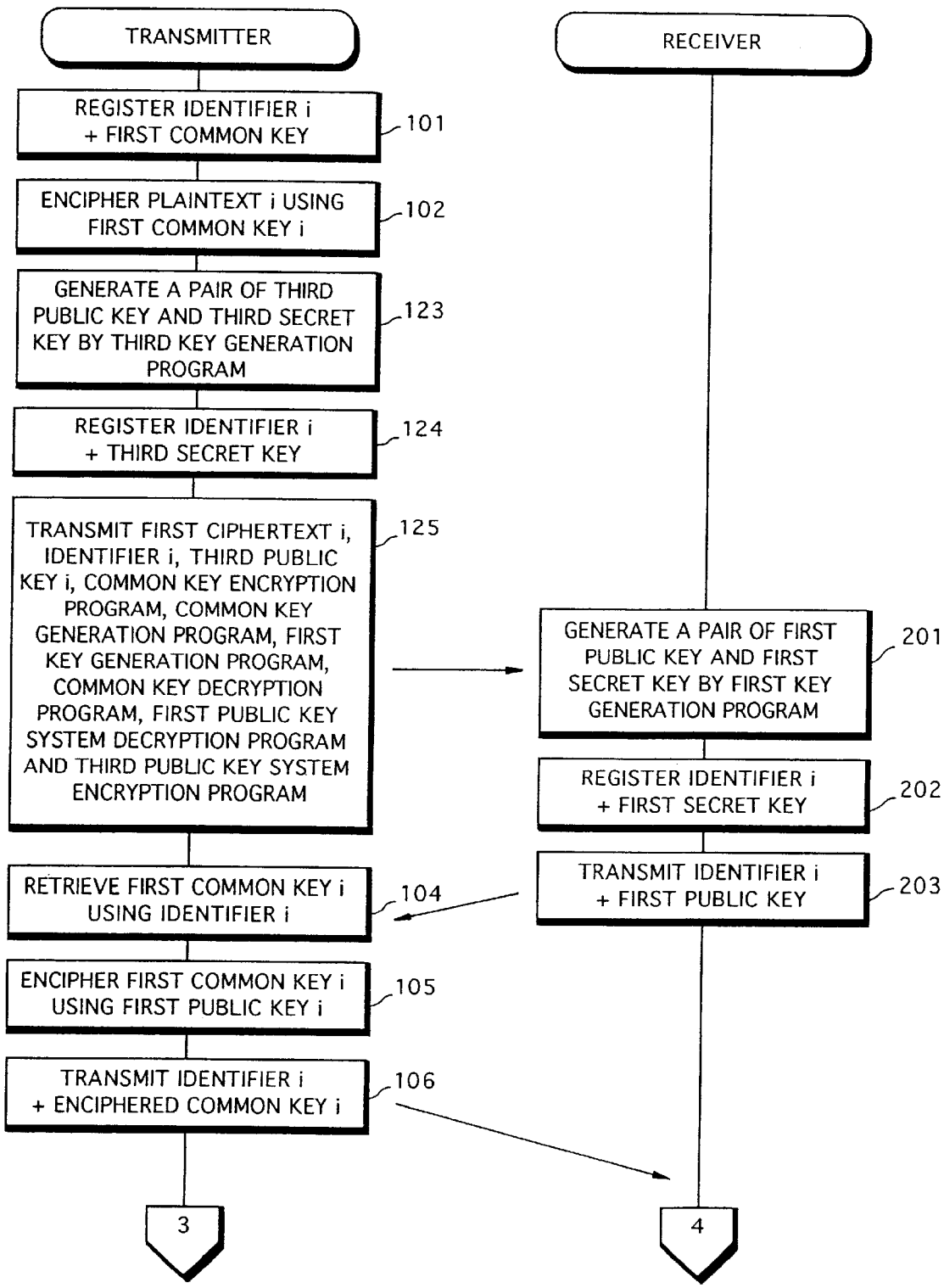
FIGS. 10 and 11 are flow charts showing the procedure for encryption processing and decryption processing in a fifth embodiment.
Figure 11:
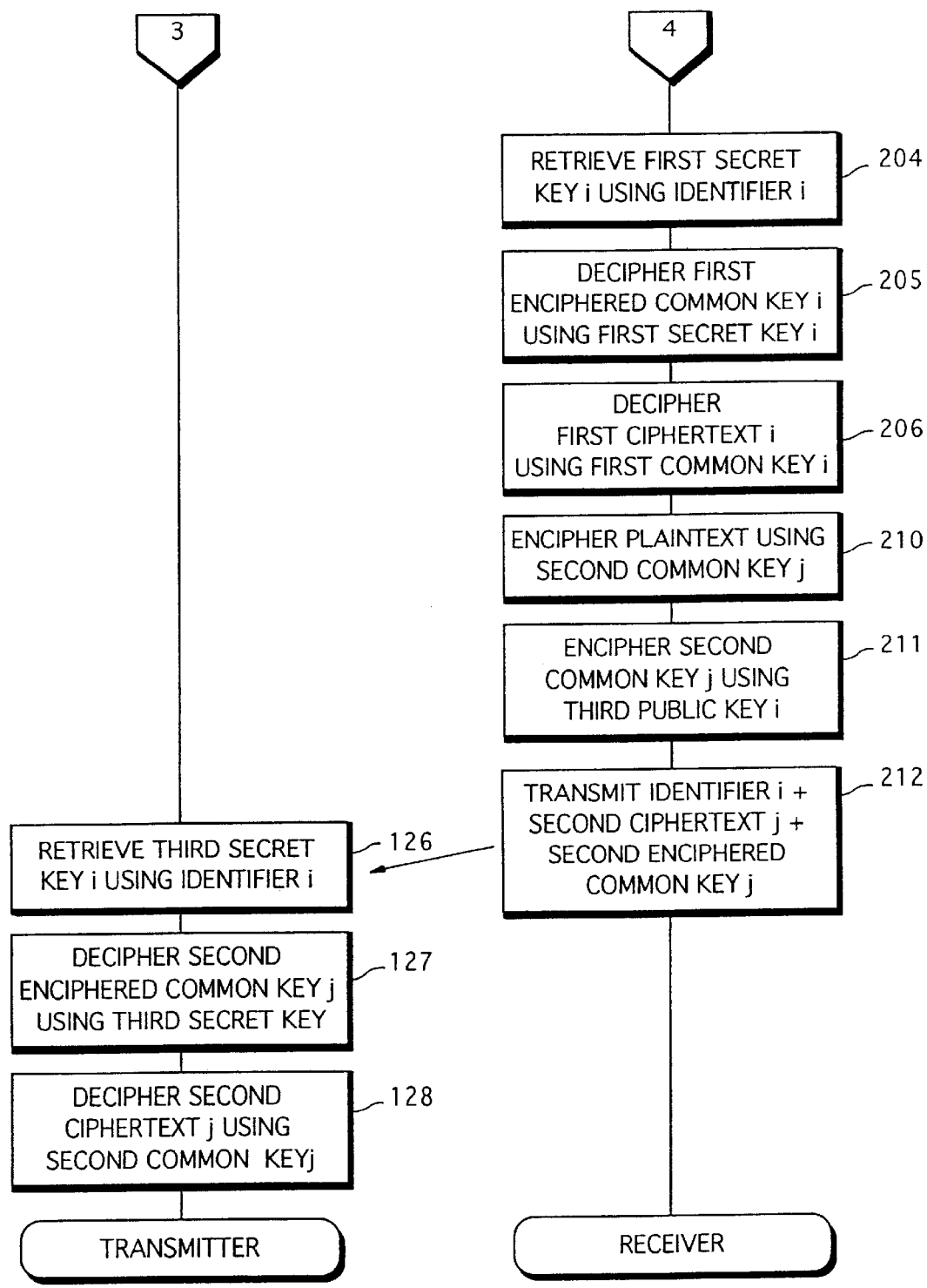

The transmitter 10 has programs for performing processing in flow charts on the left side of FIGS. 10 and 11, and these programs include the foregoing programs v) and vi) provided in the receiver 20 in the first embodiment and the following programs in addition to the foregoing programs i), ii), iii) and iv):

x) a third encryption program in a public-key cryptosystem (hereinafter referred to as a third public key system encryption program) (the first public key system encryption program and the third public key system encryption program may be the same)

xi) a third key generation program for generating a pair of a third public key and a third secret key (hereinafter referred to as a third public key/secret key generation program)

xii) a third decryption program in a public-key cryptosystem (hereinafter referred to as a third public key system decryption program) (the first public key system decryption program and the third public key system decryption program may be the same)

The above-mentioned ii) common key generation program is used for generating two common keys (which are referred to as first and second common keys).

The receiver 20 has programs for performing processing in flow charts on the right side of FIGS. 10 and 11, and part thereof (for example, a first public key/secret key generation program) is used upon being transmitted from the transmitter 10, as described later.

FIGS. 10 and 11 are flow charts showing the procedure for encryption/decryption processing in the transmitter 10, encryption/decryption processing in the receiver 20, and communication processing between the transmitter 10 and the receiver 20. Processing at the steps 101, 102, and 104 to 106 in the transmitter 10 and processing at the steps 201 to 206 in the receiver 20 are the same as those in the first embodiment (FIG. 4) and hence, the description thereof is not repeated.

The transmitter 10 that has created first ciphertext i using a first common key i (step 102) executes a third public key/secret key generation program. Consequently, a pair of a third public key and a third secret key is generated (which are referred to as a third public key i and a third secret key i)(step 123). The third secret key i in the pair of the third public key i and the third secret key i which have been generated is registered (stored) in an external storage device 18 in the transmitter 10 in correspondence with an identifier i (step 124). The third public key i, together with the first ciphertext i, the identifier i, i) the common key encryption program, ii) the common key generation program, iv) the first public key/secret key generation program, v) the common key decryption program, vi) the first public key system decryption program, and x) the third public key system encryption program, is transmitted to the receiver 20 (step 125).

Processing at the steps 201 to 203, the steps 104 to 106, and the steps 204 to 206 (which is the same as that in the first embodiment (FIG. 4)) is performed, so that the ciphertext transmitted to the receiver 20 is deciphered to obtain plaintext.

In the receiver 20 which has deciphered the ciphertext (step 206), new (another) plaintext is entered from the input device 21.

A second common key is generated in accordance with the common key generation program which has been transmitted from the transmitter 10, and an identifier j corresponds thereto (this common key shall be a second common key j). Used as the identifier j are a number which is increased or changed as the second common key is generated (a random number generated every time the second common key is generated), and a character or a number which is entered by an operator. The newly entered plaintext is enciphered using the second common key j in accordance with the common key encryption program (step 210) (created ciphertext shall be second ciphertext j).

The second common key j used for generating the second ciphertext j is then enciphered using the third public key i which has been transmitted from the transmitter 10 in accordance with the third public key system encryption program (step 211). The second enciphered common key j, together with the second ciphertext j and the identifier i, is transmitted to the transmitter 10 (step 212).

The transmitter 10 retrieves the third secret key i, which corresponds to the received identifier i, of the third secret keys registered in the external storage device 28 (step 126). A second enciphered common key j transmitted from the receiver 20 is deciphered using the retrieved third secret key i in accordance with the third public key system decryption program (step 127). Subsequently, the second ciphertext j is deciphered using the deciphered second common key j in accordance with the common key decryption program (step 128).

Sixth Embodiment

The sixth embodiment differs from the fifth embodiment in that various programs that a transmitter 10 has are provided in not the transmitter 10 but a receiver 20. That is, in the fifth embodiment, programs i), ii), iii), iv), v), vi), x), xi) and xii), which are provided in the transmitter 10, are provided in the receiver 20.

Figure 12:
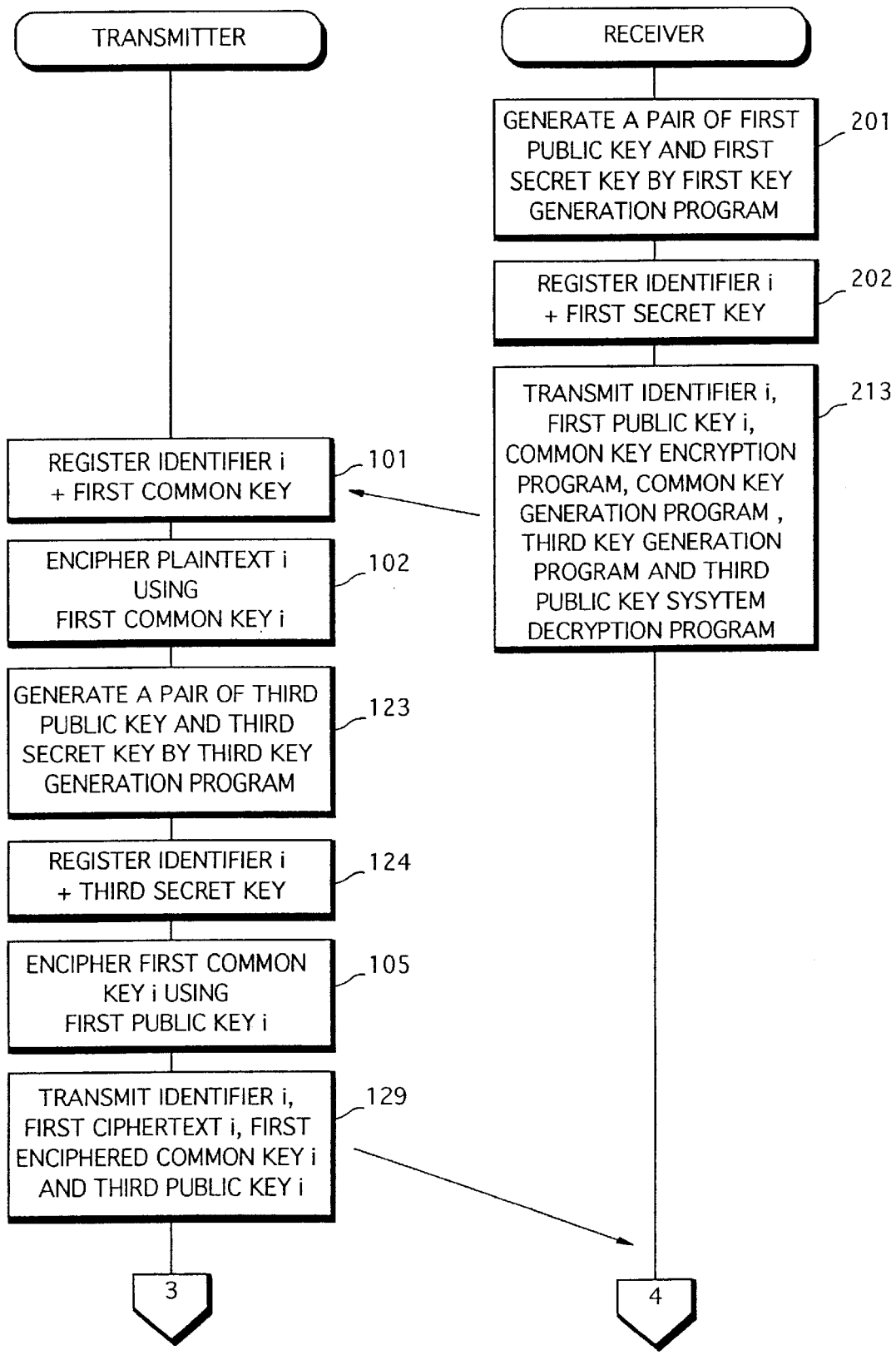
FIG. 12 is a flow chart showing the procedure for encryption processing and decryption processing in a sixth embodiment.

FIG. 12 is a flow chart showing the procedure for encryption/decryption processing in the transmitter 10, encryption/decryption processing in the receiver 20, and communication processing between the transmitter 10 and the receiver 20. The same processing as that in the fifth embodiment (FIGS. 10 and 11) excluding processing at the steps 213 in the receiver 20 and processing at the step 129 in the transmitter 10 is performed.

In the receiver 20, a pair of a first public key and a first secret key is first generated in accordance with a first public key/secret key generation program (step 201). The first secret key i is registered in an external storage device 28 in the receiver 20 (step 202). On the other hand, the first public key i, together with an identifier i, i) a common key encryption program, ii) a common key generation program, v) a common key decryption program, xi) a third public key/secret key generation program, and xii) a third public key system decryption program, is transmitted to the transmitter 10 (step 213).

After processing at the steps 101 to 124 and the step 105 (which is the same as that shown in FIG. 10) is performed in the transmitter 10, first ciphertext i, an identifier i, a first enciphered common key i and a third public key i are transmitted to the receiver 20 (step 129).

In the receiver 20 which has received the first ciphertext i, the identifier i, the first enciphered common key i and the third public key i, processing at the steps 204 to 206 (FIG. 11) is performed, so that the first ciphertext i is deciphered to obtain plaintext. Processing at the steps 210 to 212 is further performed in the receiver 20, so that the second ciphertext j is transmitted to the transmitter 10. The processing at the steps 126 to 128 is performed in the transmitter 10, so that the second ciphertext j is deciphered in the transmitter 10.

Seventh Embodiment

The seventh embodiment uses a public key for enciphering plaintext in a transmitter 10. The public key, an identifier and a first public key system encryption program are transmitted from a receiver 20 to the transmitter 10 with they being incorporated in a file attached to an electronic mail.

The overall configuration of a cipher network system and the configuration of the transmitter 10 (the receiver 20) are the same as those in the first embodiment (FIGS. 1 and 2). A program for transmitting and receiving an electronic mail (hereinafter referred to as an electronic mail program) is installed in both the transmitter 10 and the receiver 20.

Figure 13:
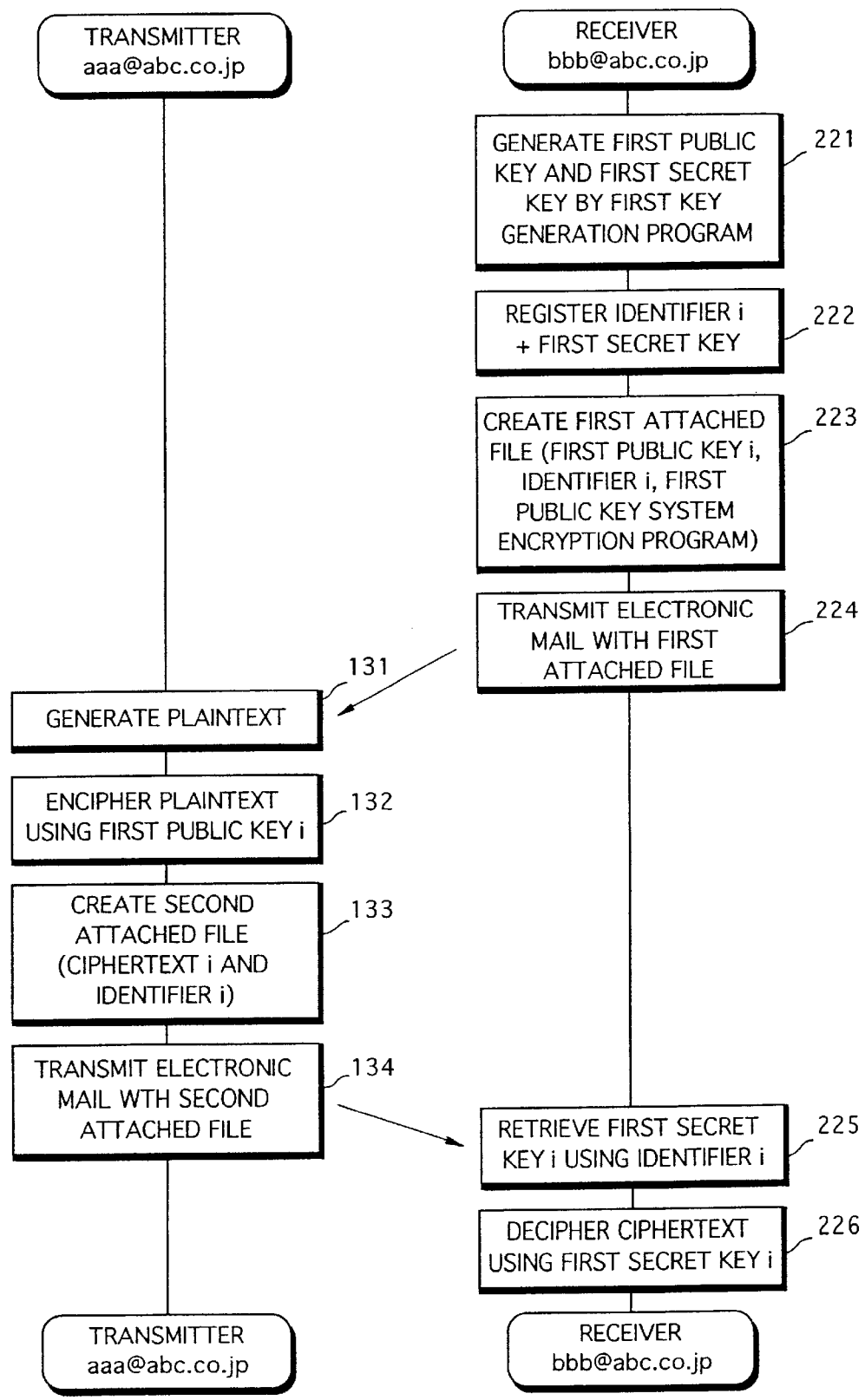
FIG. 13 is a flow chart showing the procedure for encryption processing and decryption processing in a seventh embodiment.

The transmitter 10 is provided with iii) a first public key system encryption program, for example, transmitted from the receiver 20 in order to perform processing in a flow chart on the left side of FIG. 13. The receiver 20 has iii) a first public key system encryption program (this program is not used in the receiver 20 but sent to the transmitter 10 as described above), iv) a first public key/secret key generation program, and vi) a first public key system decryption program, described above, in order to perform processing in a flow chart on the right side of FIG. 13.

FIG. 13 is a flow chart showing the procedure for encryption processing in the transmitter 10, decryption processing in the receiver 20, and communication processing between the transmitter 10 and the receiver 20.

When the receiver 20 is notified that ciphertext will be transmitted from the transmitter 10, or when the receiver 20 requests that ciphertext should be transmitted from the transmitter 10, the receiver 20 executes the first public key/secret key generation program, to generate a pair of the first public key and the first secret key (step 221). At this time, an identifier i is generated. The first public key and the first secret key correspond to the identifier i (which shall be a first public key i and a first secret key i). The first secret key i is stored in an external storage device 28 in the receiver 20 in correspondence with the identifier i.

The identifier i, the first public key i and the first public key/secret key encryption program are incorporated in an attached file (which shall be a first attached file) in accordance with the electronic mail program in the receiver 20 (step 223). The first attached file is transmitted from the receiver 20 to the transmitter 10 by the electronic mail (step 224).

In the transmitter 10, plaintext is generated (or has been already generated) (step 131). When the electronic mail including the first attached file is received, the plaintext is enciphered using the first public key system encryption program and the first public key i which are incorporated in the first attached file (the created ciphertext shall be ciphertext i) (step 132).

The ciphertext i and the identifier i are incorporated in the attached file (the attached file shall be a second attached file) (step 133), and is transmitted from the transmitter 10 to the receiver 20 by the electronic mail (step 134).

In the receiver 20 which has received the electronic mail with the second attached file, the first secret key i, which corresponds to the identifier i, of the first secret keys registered in the external storage device 28 in the receiver 20 is retrieved on the basis of the identifier i stored in the second attached file (step 225). The retrieved first secret key i is one which is paired with the first public key i used for creating the ciphertext i (step 132).

The ciphertext i is deciphered using the retrieved first secret key i in accordance with the first public key system decryption program (step 226).

Eighth Embodiment

The eighth embodiment utilizes WWW (World Wide Web) in encryption communication. A WWW browser is installed in a transmitter 10, and a receiver 20 functions as a WWW server. The eighth embodiment is the same as the first embodiment in that plaintext is enciphered by a common key in the transmitter 10, the common key is transmitted to the receiver 20 after being enciphered using a first public key which has been generated in the receiver 20, the enciphered common key is deciphered by a first secret key paired with the first public key in the receiver 20, and ciphertext is deciphered by the deciphered common key.

The transmitter 10 does not has a program for encryption processing. Encryption processing and creation of an attached file in the transmitter 10 are performed using ActiveX control (or Plug-in software or JAVA applet, etc.), which is obtained from the receiver 20 as described later. On the other hand, the receiver 20 comprises an SSI (Server Side Include) program for generating a pair of the first public key and the first secret key, the above-mentioned ActiveX control, vi) a first public key system decryption program, and v) a common key decryption program.

Figure 14:
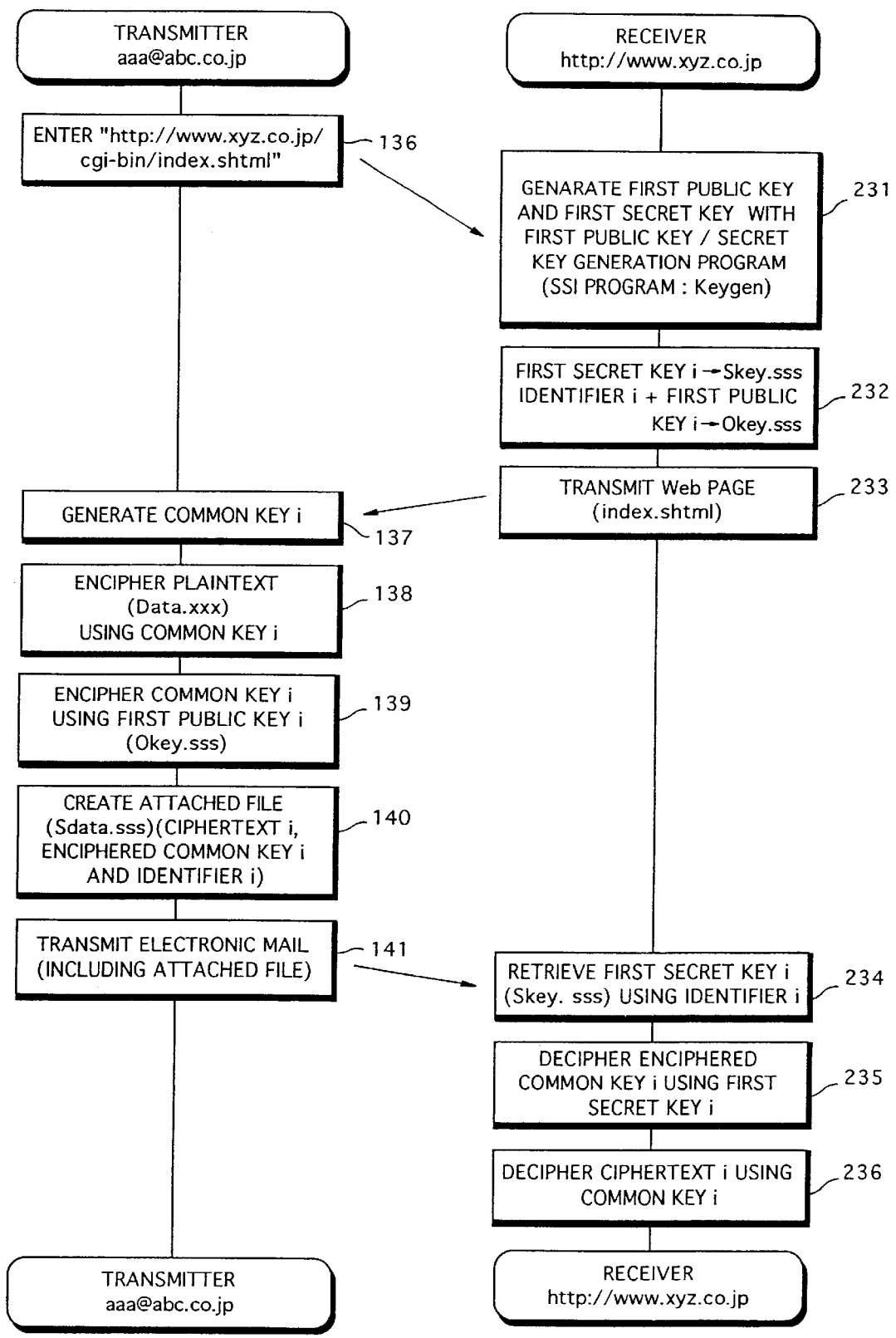
FIG. 14 is a flow chart showing the procedure for encryption processing and decryption processing in an eighth embodiment.

FIG. 14 is a flow chart showing the procedure for communication processing performed between the transmitter 10 and the receiver 20. In the transmitter 10, URL (Uniform Resource Locator) (the receiver 20) (a protocol name, a server name, a file name) for accessing the WWW server is entered using the WWW browser in the transmitter 10 (step 136). For example, "http://www.xyz.co.jp/cgi-bin/index.shtml" is entered. Consequently, a Web page "index.shtml" registered in a directory "cgi-bin" of the receiver 20 is downloaded into the transmitter 10. "index.shtml" is an HTML (HyperText Markup Language) file described by a hypertext. An extender (extension code) "shtml" of "index.shtml" means that description relating to the SSI program is included in this file. An example of the file "index.shtml" is shown in FIG. 15.

The "index.shtml" file shown in FIG. 15 includes description (the sixth line) directed to the receiver 20 and description (the first to fifth lines and the seventh to eighteenth lines) directed to the transmitter 10. The receiver 20 reads "index.shtml", to execute an instruction in the sixth line directed to the receiver 20 prior to transmission of "index.shtml" to the transmitter 10.

The sixth line means an instruction to execute the SSI program (a program name "keygen"). The SSI program "keygen" is stored in an external storage device 28 of the receiver 20. The receiver 20 reads out the "keygen" program from the external storage device 28 and executes the "keygen" program. In the receiver 20, a pair of a first public key and a first secret key is generated in accordance with the "keygen" program in the receiver 20 (step 231).

Identifiers i corresponds to each of the first public key and the first secret key. A file of the first secret key i is taken as "Skey.sss", and a file including the identifier i and the first public key i is taken as "Okey.sss". The file "Skey.sss" is transferred to the external storage device 28 in the receiver 20 (that is, the first secret key i corresponding to the identifier i is registered in the external storage device 28). The file "Okey.sss" including the first public key i and the identifier i is also stored in the external storage device 28 of the receiver 20 (step 232). A Web page (index.shtml) is transmitted from the receiver 20 to the transmitter 10 (step 233).

The meaning of "index.shtml" which has been transmitted to the transmitter 10 is as follows:

the first line: indicates the start of the description of a hypertext.

the second line: indicates the start of text information.

the third line: indicates that "Secret Service" described between <title> and </title> is a title for the text information (a title displayed on a display screen by a WWW browser). Characters "Secret Service" are displayed in the upper part of a display screen of a display device in the transmitter 10.

the fourth line: indicates the termination of the text information.

the fifth line: indicates the start of a text body.

the sixth line: indicates an instruction to execute the SSI program "keygen", as described above (this description is ignored in the transmitter 10).

the seventh line: indicates line feed (starting of a new line).

the eighth line: indicates that characters "Keep Your Information Safe!" are displayed on the display screen.

the ninth line: indicates line feed (starting of a new line).

the tenth line: indicates the start of an object (an object of operation). The object is ActiveX control named "Secret", which is a cipher file creation program.

the eleventh line: "classid" indicates an inherent ID given to the object. That is, an ID for the ActiveX control "Secret" is "clsid: 7253CB12-9CE0-11cf-0f34-0000E8A7440".

the twelfth line: "codebase" indicates URL (Uniform Resource Location) representing a file in a server storing the object (Secret). That is, the ActiveX control "Secret" is stored in "http//www.xyz.co.jp/encode". The file represented by the URL in the receiver 20 (server), that is, the Active control "Secret" is downloaded into the transmitter 10, and is executed in the transmitter 10. This corresponds to processing at the steps 137 to 140 described later.

the thirteenth line: indicates that the file "Okey.sss" of the same directory as the HTML file is defined in a variable "Okey" of the ActiveX control. The first public key i and the identifier i are included, as described above, in the file "Okey.sss".

the fourteenth line: indicates that an address (path) "C:/windows/box/Data.xxx" of a file which a user enciphers (a file including plaintext to be enciphered) is defined in a variable "Data" of the ActiveX control.

the fifteenth line: indicates that an address (path) "C:/windows/box/SData.sss" of a file which a user stores a cipher file (this is an attached file, described later, and includes an identifier i, an enciphered common key i and ciphertext i) is defined in a variable "SData" of the ActiveX control.

the sixteenth line: indicates the termination of the object (ActiveX control "Secret").

the seventeenth line: indicates the termination of the text body.

the eighteenth line: indicates the termination of the hypertext.

The transmitter 10 first displays the characters in the eighth line in accordance with "index.shtml" (FIG. 15), and accesses the URL (the file in the server, that is, the receiver 20) in the twelfth line. The object (ActiveX control) "Secret" is downloaded from the URL (http://www.xyz.co.jp/encode), and the following processing is performed in the transmitter 10 in accordance with this program.

The file "Okey.sss" stored in the external storage device 28 of the receiver 20 is accessed, to acquire the first public key i and the identifier i included therein. A common key is generated (step 137). The identifier i acquired from the receiver 20 corresponds to the common key (this shall be a common key i). Plaintext stored in "Data.xxx" is then enciphered using the common key i, to create ciphertext i (step 138). Further, the common key i used for creating the ciphertext i is enciphered using the first public key i acquired from the receiver 20, to generate an enciphered common key i (step 139).

Finally, an attached file (SData.sss) in which the ciphertext i, the enciphered common key i and the identifier i are incorporated is created (step 140), so that all processing by the object (ActiveX control) "Secret" is terminated.

The attached file (SData.sss) in which the ciphertext i, the identifier i and the enciphered common key i are incorporated is transmitted to the receiver 20 (server) from the transmitter 10 by an electronic mail (step 141).

In the receiver 20 which has received the electronic mail including the attached file, the first secret key i, which corresponds to the identifier i, of the first secret keys stored in the external storage device 28 of the receiver 20 is retrieved on the basis of the identifier i inside the attached file (SData.sss) (step 234). The enciphered common key i is deciphered using the retrieved first secret key i in accordance with the first public key system decryption program (step 235). Finally, the ciphertext i is deciphered using the deciphered common key i in accordance with the common key decryption program (step 236). Plaintext is thus obtained.

The ActiveX control for encryption processing may be not downloaded into the transmitter 10 from the receiver 20 but downloaded from another device (a server) connected to the network. The URL in the device (the server) having the ActiveX control is described in the twelfth line of the file "index.shtml" shown in FIG. 15.

Ninth Embodiment

Figure 16:
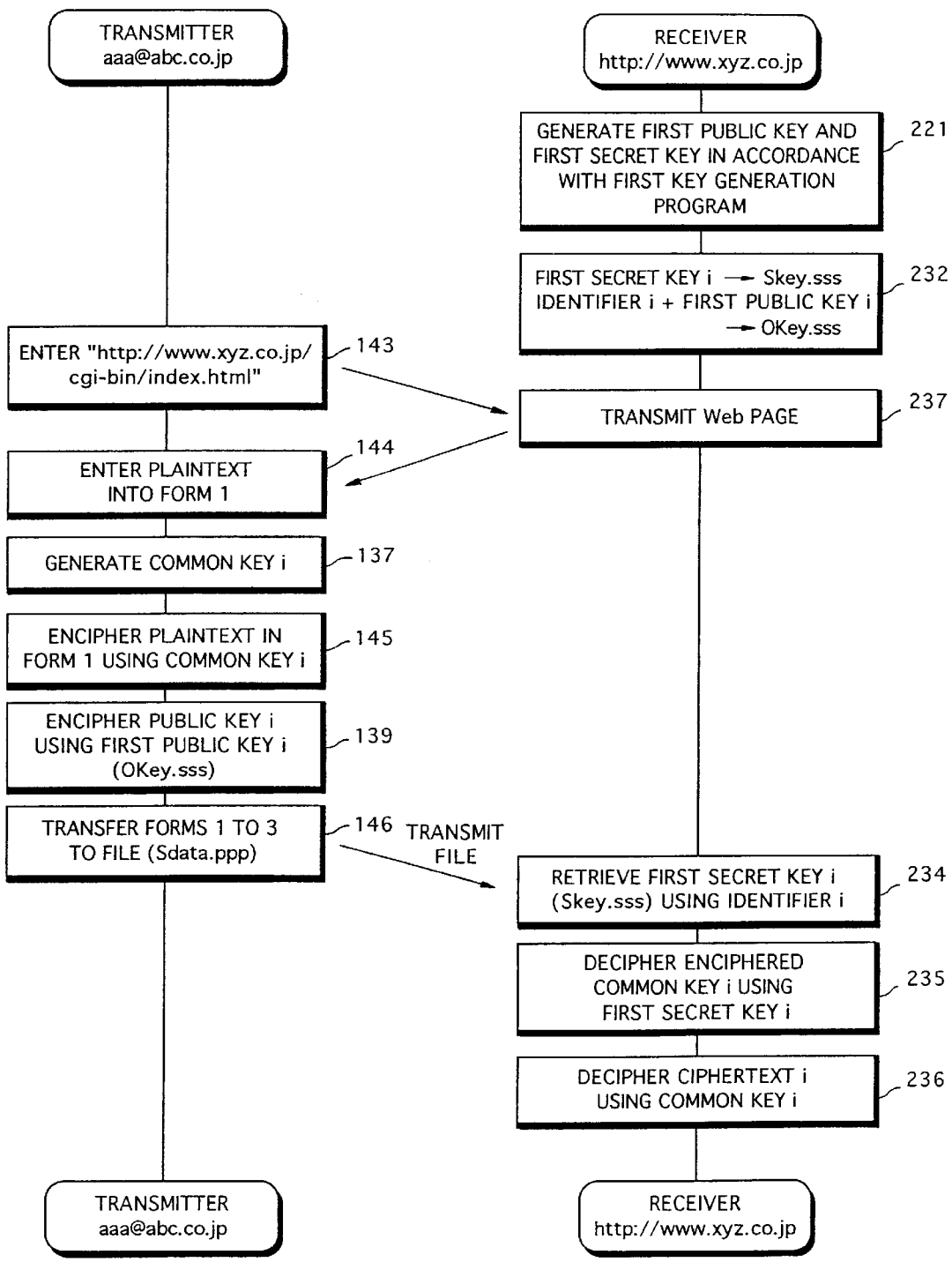
FIG. 16 is a flow chart showing the procedure for encryption processing and decryption processing in a ninth embodiment.

The ninth embodiment utilizes WWW for encryption communication, as in the eighth embodiment. No program for encryption processing is required in a transmitter 10. On the other hand, a receiver 20 has iv) a first public key/secret key generation program (for example, a CGI (Common Gateway Interface) Keygen program) executed for each access, as well as Activex control (a program named Encode) for performing encryption processing of plaintext and encryption processing of a common key, v) a common key decryption program, and vi) a first public key system decryption program. The transmitter 10 obtains the ActiveX control from a Web page of the receiver 20, and executes encryption processing in accordance with the obtained Activex control. FIG. 16 is a flow chart showing the procedure for processing in the transmitter 10 and the receiver 20 as well as communication processing between the transmitter 10 and the receiver 20.

A Web page is accessed, so that a pair of a first public key and a first secret key is generated in accordance with the first public key/secret key generation program (step 221). A file of the first secret key i is taken as "Skey.sss", and a file including a first public key i and an identifier i is taken as "Okey.sss". Both the file "Skey.sss" and the file "Okey.sss" are registered in an external storage device 28 of the receiver 20 in correspondence with the identifier i (step 232).

A WWW browser is executed in the transmitter 10, so that URL in the receiver 20 is entered (step 143). The transmitter 10 is connected to the receiver 20, and a Web page (an "index.html" file) is transmitted from the receiver 20 to the transmitter 10 (step 237).

An example of an HTML list included in the Web page acquired by the transmitter 10 is illustrated in FIG. 17. The meaning of the HTML list is as follows:

the first line: indicates the start of a hypertext.

the second line: indicates the start of text information.

the third line: indicates that "Secret" described between <Title> and </Title> is a title for the text information.

the fourth line: indicates the termination of the text information.

the fifth line: indicates the start of a text body.

the sixth line: indicates line feed (starting of a new line).

the seventh line: indicates that "Your Message Will Be Transmitted Safely!" is displayed.

the eighth line: indicates line feed (starting of a new line).

the ninth line: "form" indicates the start of a form (a typical display function for obtaining information from a user who sees a page), "name="Text"" indicates that the name of the form is "Text", "action='cgi-bin/formtofile.cgi'" indicates that inputted information is sent to the CGI program of a server, the sent information is processed by the CGI program in the receiving server, and the result of the processing is filed and stored, and "method='post'" indicates that inputted information is taken as entry from a keyboard.

the tenth line: indicates the start of a form "textarea" (form 1) (an area to be entered is indicated by a square frame), and indicates that the name of the form is "Message", and the size of the frame is 20 rows by 82 columns.

the eleventh line indicates that "Please Leave A Message" is displayed.

the twelfth line: indicates the termination of the form "textarea".

the thirteenth line: indicates line feed (starting of a new line).

the fourteenth line: indicates that a button on which "Transmission" is written is displayed, and an operation set in the ninth line "action= . . . " is executed when the displayed button is clicked by "type ='submit'".

The fifteenth line: indicates that "type='hidden'" is such a form that information is not displayed on a window of a user (invisible), and indicates a form which has an initial value 0, and is named "Codekey" (form 2).

the sixteenth line: indicates a form (form 3) which is invisible, has an initial value 0, and is named "Sikibetusi".

the seventeenth line: indicates that an FTP user ID (a mail address) which is invisible and is assigned to the server storing the present hypertext is "ccc@xyz.co.jp".

the eighteenth line: indicates that the name of a file to be invisibly outputted is taken as "SData.ppp".

the nineteenth line: indicates that an HTML file displayed after "submit" in the fourteenth line is taken as "http://www.xyz.co.jp".

the twentieth line: indicates the termination of the form.

the twenty-first line: indicates the start of a script in a language named "VBScript" (the script is a text in which the procedure for processing is described).

the twenty-second line: "<!- -" inherently indicates the start of a comment line, but indicates that a text subsequent thereto is effectively processed as a script when display software (a browser) of the hypertext has a function of executing the script language described in the twenty-first line, while being ignored as a comment when it does not have the function.

the twenty-third line: indicates a subroutine executed when the form "name=Button" described in the fourteenth line is clicked.

the twenty-fourth line: declares that "The Data" and "Inpdata" are variables.

the twenty-fifth line: indicates that a form itself named "Text" is substituted in the variable "The Data".

the twenty-sixth line: indicates that data that has been entered in a form named "Message" is substituted in the variable "Inpdata".

the twenty-seventh line: indicates that the value of the variable "Inpdata" is substituted in a param tag "Data" of an object "Encode".

the twenty-eighth line: indicates that the value of a param tag "Cdata" of the object "Encode" is substituted in a form named "Message".

the twenty-ninth line: indicates that the value of a param tag "Ckey" of the object "Encode" is substituted in a form named "Codekey".

the thirtieth line: indicates that the value of a param tag "Mark" of the object "Encode" is substituted in a form named "Sikibetusi".

the thirty-first line: indicates the termination of the subroutine.

The thirty-second line: indicates the termination of a comment line.

the thirty-third line: indicates the termination of the script.

the thirty-fourth line: indicates the start of the object named "Encode" (ActiveX control herein; which performs encryption processing at the steps 144 to 146 in FIG. 16).

the thirty-fifth line: indicates an inherent ID in the object "Encode".

the thirty-sixth line: indicates the source URL (http://www.xyz.co.jp/encode) from which the object "Encode" is downloaded.

the thirty-seventh line: indicates that a file "Okey.sss" of the same directory as that of the hypertext is defined in the param tag "Okey" of the object "Encode".

the thirty-eighth line: indicates that the param tag "Data" having an initial value 0 is defined in the object "Encode".

the thirty-ninth line: indicates that the param tag "Cdata" having an initial value 0 is defined in the object "Encode".

the fortieth line: indicates that the param tag "Ckey" having an initial value 0 is defined in the object "Encode".

the forty-first line: indicates that the param tag "Mark" having an initial value 0 is defined in the object "Encode".

the forty-second line: indicates the termination of the object.

the forty-third line: indicates the termination of the text body.

the forty-fourth line: indicates the termination of the hypertext.

The transmitter 10 is operated as follows by the Web browser in accordance with the HTML list.

In a display device in the transmitter 10 which has received the Web page, the form 1 (Message) for entry of plaintext (a data input column) is displayed. An operator of the transmitter 10 enters plaintext (which may be the name of a user, order data, an account number, etc., as described above) into the form 1 (step 144).

The transmitter 10 accesses the receiver 20, to download the ActiveX control (the Encode program) in accordance with the URL (the receiver 20) in the thirty-sixth line of the HTML list. The program is downloaded in the transmitter 10, and is then executed. That is, the file "Okey.sss" stored in the external storage device 28 in the receiver 20 is accessed, to acquire the first public key i and the identifier i which are included therein. A common key i is generated (step 137), plaintext in the form 1 is enciphered using the common key i (the ciphertext i is created), and the created ciphertext i is stored in the form 1 (step 145). The common key i used for creating the ciphertext i is then enciphered using the first public key i (okey.sss) (the enciphered common key i is generated), and is stored in the form 2 set as an invisible field (hidden) (step 139). Further, the identifier i is stored in the form 3 set as an invisible field. Data in the forms 1 to 3 are stored in a designated file (Sdata.ppp). The file (Sdata.ppp) is transferred to the external storage device 28 of the receiver 20 (step 146).

In the receiver 20 which has received the file "Sdata.ppp" including the ciphertext i, the enciphered common key i and the identifier i, the same processing as that at the steps 234 to 236 (which is the same as that in the eighth embodiment (FIG. 14)) is performed, so that the ciphertext i is deciphered to obtain plaintext.

It goes without saying that the ActiveX control may be previously stored in a device (server) other than the receiver 20 connected to the network, and downloaded from the device (server).

Tenth Embodiment

The tenth embodiment is for confirming, in a transmitter 10, whether or not a first public key transmitted from a receiver 20 to the transmitter 10 is not altered. The configuration of a cipher network system and the configuration of the transmitter 10 (the receiver 20) are the same as those in the first embodiment.

Figure 18:
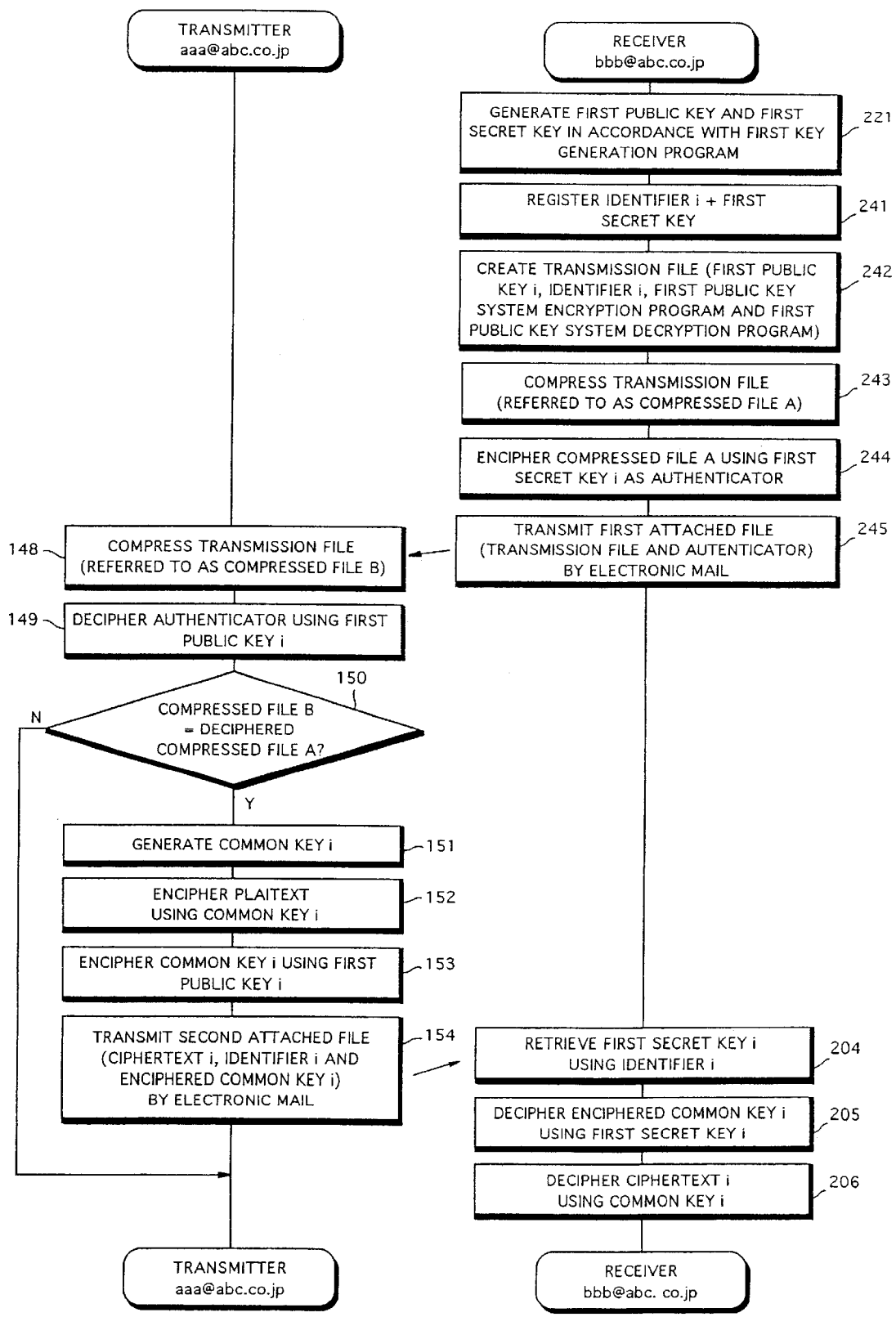
FIG. 18 is a flow chart showing the procedure for encryption processing and decryption processing in a tenth embodiment.

The transmitter 10 has programs for performing processing in a flow chart on the left side of FIG. 18, and the programs include i) a common key encryption program, ii) a common key generation program, iii) a first public key system encryption program, and vi) a first public key system decryption program, described above (the above-mentioned programs iii) and vi) are transmitted from the receiver 20 to the transmitter 10). Further, the transmitter 10 comprises an electronic mail program and a data compression program.

The receiver 20 has programs for performing processing in a flow chart on the right side of FIG. 18, and the programs include iii) a first public key system encryption program, iv) a first public key/secret key generation program, v) a common key decryption program, and vi) a first public key system decryption program, described above.

Further, the receiver 20 comprises an electronic mail program and a data compression program.

FIG. 18 is a flow chart showing the procedure for various types of processing in the transmitter 10 and the receiver 20 and communication processing between the transmitter 10 and the receiver 20. Processing at the step 221 and processing at the steps 204 to 206 are respectively the same as that in the seventh embodiment (FIG. 14) and that in the first embodiment (FIG. 4).

The receiver 20 generates a pair of a first public key i and a first secret key i in accordance with the first public key/secret key generation program (step 221), and registers the first secret key i in an external storage device 28 in correspondence with an identifier i (step 241).

In the receiver 20, a transmission file including the first public key i, the identifier i, the first public key system encryption program, and the first public key system decryption program is created (step 242).

The created transmission file is data-compressed (step 243). The compressed transmission file shall be referred to as a compressed file A.

The compressed file A is enciphered using the first secret key i in accordance with the first public key system encryption program(step 244). The compressed file A which has been enciphered using the first secret key i is taken as an authenticator.

The transmission file (the first public key i, the identifier i, the first public key system encryption program, and the first public key system decryption program) and the authenticator are incorporated in a first attached file. The first attached file is transmitted to the transmitter 10 by an electronic mail (step 245).

The transmitter 10 opens the received first attached file, to take out the transmission file (the first public key i, the identifier i, the first public key system encryption program, and the first public key system decryption program) and the authenticator which are included therein. The received transmission file is compressed (step 148). The compressed file generated herein shall be referred to as a compressed file B.

The received authenticator is deciphered using the received first public key i in accordance with the first public key system decryption program also received (step 149). The first public key i used herein is paired with the first secret key i used for the encryption of the compressed file A (generation of the authenticator) (step 244). The compressed file obtained as the result of the decryption of the authenticator shall be referred to as a deciphered compressed file A.

The transmitter 10 compares the compressed file B generated at the step 148 with the deciphered compressed file A obtained at the step 149 (step 150).

If the compressed file B and the deciphered compressed file A coincide with each other (YES at step 150), it is judged that the first public key i which has been transmitted from the receiver 20 to the transmitter 10 is correct. A common key i is generated in accordance with the common key generation program (step 151). Plaintext is enciphered using the common key i (step 152), and the common key i is enciphered using the first public key i (step 153). A second attached file in which the ciphertext i, the identifier i and the enciphered common key i are incorporated is transmitted to the receiver 20 by an electronic mail in accordance with an electronic mail program (step 154).

In the receiver 20, processing at the steps 204 to 206 (which is the same as that in the first embodiment (FIG. 4)) is performed, so that the received ciphertext i is deciphered to obtain plaintext.

When the compressed file B generated at the step 148 and the deciphered compressed file A obtained at the step 149 differ from each other (NO at step 150), the contents of the first attached file transmitted from the receiver 20 to the transmitter 10 may be altered during the transmission. The transmitter 10 does not perform the processing at the steps 151 to 154. The transmitter 10 does not transmit the ciphertext i to the receiver 20.

Used as the data compression program provided in the transmitter 10 and the receiver 20 may be one capable of generating compressed data from which the original data is difficult to presume (which means to have unidirectional) and having such an algorithm as to generate, when different data is compressed, the compressed different data (for example, an algorithm including a hash function having unidirectionality). It is possible to make judgment that the first public key in the transmitter 10 is correct (which is not altered halfway) more reliable.

Also in the eighth and ninth embodiments, it is possible to prevent the first public key from being altered, as in the tenth embodiment. In this case, a part or the whole of information in the web page and the first public key are data-compressed, and the compressed ones are enciphered using the secret key i, to obtain an authenticator.

Eleventh Embodiment

Figure 19:
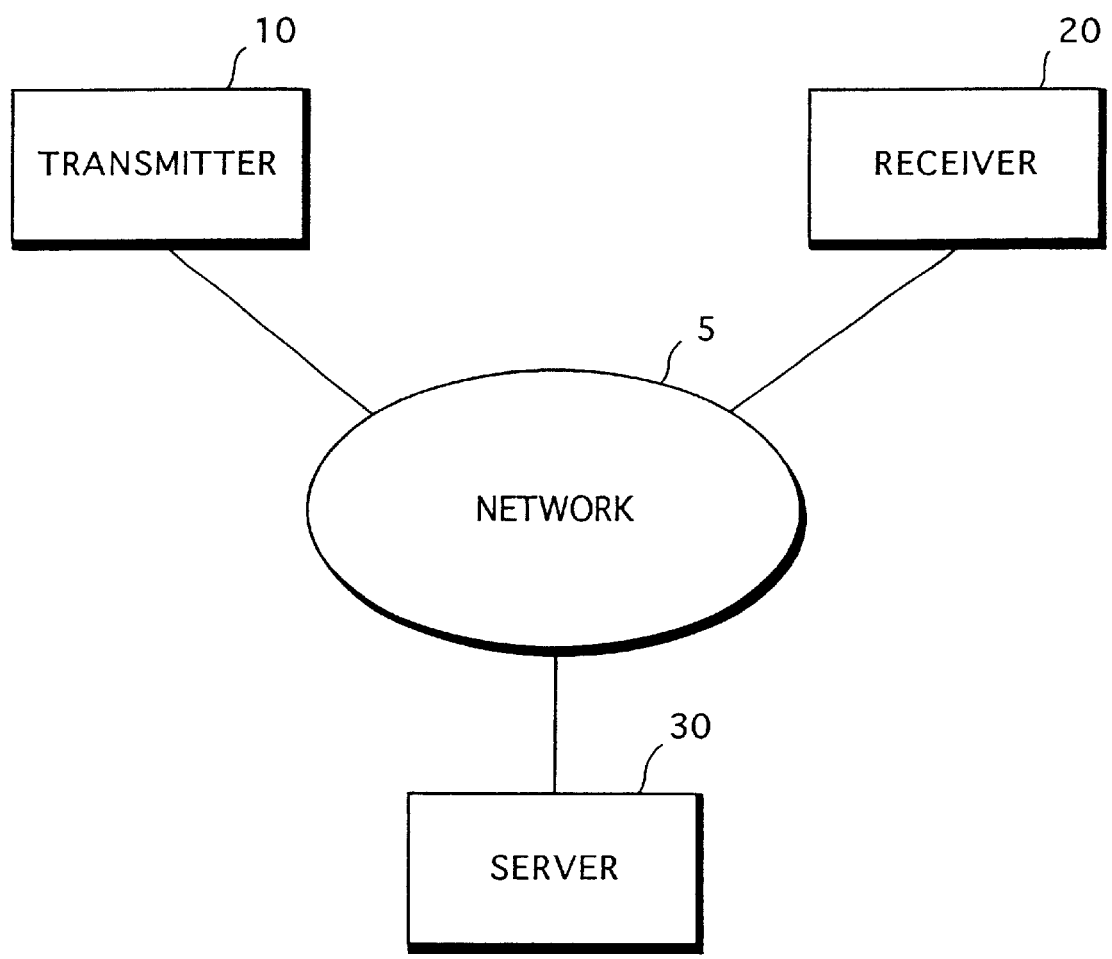
FIG. 19 illustrates the overall outline of a cipher network system.

FIG. 19 illustrates the overall configuration of a cipher network system in the eleventh embodiment.

In the cipher network system in the eleventh embodiment, a server 30 is connected to a network 5 in addition to a transmitter 10 and a receiver 20. The configurations of the transmitter 10 and the receiver 20 are the same as those shown in the first embodiment (FIG. 2). A server 30 basically has the same hardware configuration as those of the transmitter 10 and the receiver 20.

Figure 20:
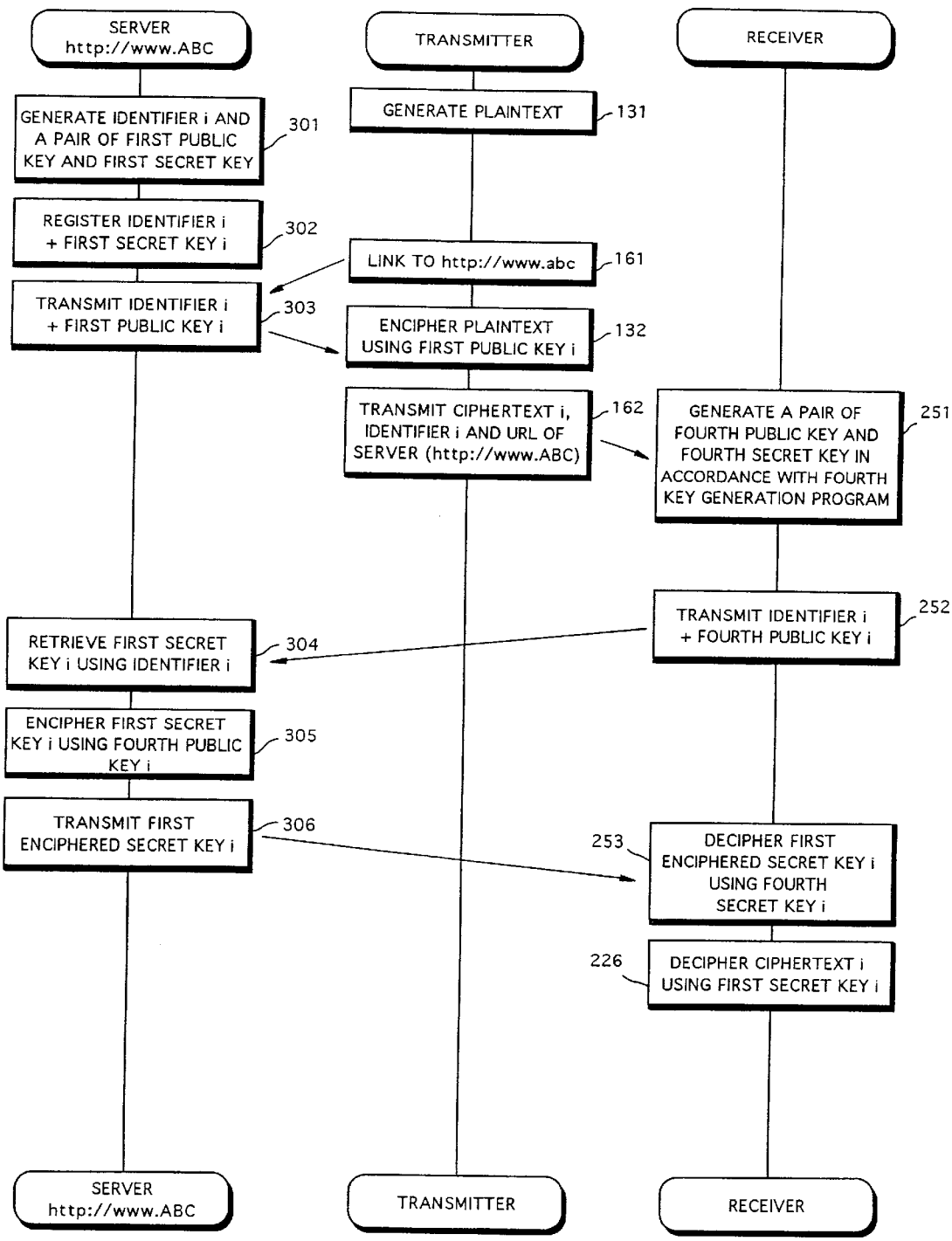
FIG. 20 is a flow chart showing the procedure for encryption processing and decryption processing in an eleventh embodiment.

The transmitter 10 has programs for performing processing in a flow chart in the center of FIG. 20, and the programs include iii) a first public key system encryption program, described above.

The receiver 20 has programs for performing processing in a flow chart on the right side of FIG. 20, and the programs include the following problems in addition to vi) a first public key system decryption program, described above.

xiii) a fourth key generation program for generating a pair of a fourth public key and a fourth secret key (hereinafter referred to as a fourth public key/secret key generation program)

xiv) a fourth decryption program in the public-key cryptosystem (hereinafter referred to as a fourth public key system decryption program)

The server 30 has programs for performing processing in a flow chart on the left side of FIG. 20, and the programs include the following program in addition to iv) a first public key/secret key generation program, described above.

xv) a fourth encryption program in the public key cipher system (hereinafter referred to as a fourth public key system encryption program).

FIG. 20 is a flow chart showing the procedure for processing in the transmitter 10, the receiver 20 and the server 30 and communication processing among the transmitter 10, the receiver 20 and the server 30. Processing at the steps 131 and 132 in the transmitter 10 is the same as the processing in the seventh embodiment (FIG. 13), and processing at the step 226 in the receiver 20 is the same as the processing in the seventh embodiment (FIG. 13).

The server 30 generates a pair of a first public key and a first secret key (step 301). The first secret key i is registered in a storage device of the server 30 in correspondence with the identifier i (step 302).

Plaintext is generated in the transmitter 10 (step 131). When URL (http://www.ABC) of the server 30 is entered by a WWW browser (step 161), the transmitter 10 is connected to the server 30. A request to transmit the first public key i is transmitted, so that the first public key i and the identifier i are transmitted from the server 30 to the transmitter 10 (step 303).

In the transmitter 10, plaintext is enciphered using the transmitted first public key i in accordance with the first public key system encryption program (step 132). The ciphertext i, the identifier i and the URL of the server 30 are transmitted from the transmitter 10 to the receiver 20 (step 162).

In the receiver 20 which has received the ciphertext i, the identifier i and the URL of the server 30, a pair of the fourth public key and the fourth secret key is generated (they shall be a fourth public key i and a fourth secret key i) in accordance with the fourth public key/secret key generation program (step 251).

The receiver 20 is connected to the server 30 using the URL (http://www.ABC) of the server 30 which has been transmitted from the transmitter 10, so that the fourth public key i and the identifier i are transmitted from the receiver 20 to the server 30 (step 252).

The server 30 retrieves the first secret key i, which corresponds to the received identifier i, of the first secret keys registered in the storage device (step 304). The retrieved first secret key i is one which is paired with the first public key i used for the encryption of the plaintext in the transmitter 10 (step 132).

The retrieved first secret key is then enciphered using the fourth public key i transmitted from the receiver 20 in accordance with the fourth public key system encryption program (step 305). The first enciphered secret key i is transmitted from the server 30 to the receiver 20 (step 306).

In the receiver 20, the first enciphered secret key i transmitted from the server 30 is deciphered using the fourth secret key i in accordance with the fourth public key system decryption program (step 253). The ciphertext i that has been transmitted from the transmitter 10 is deciphered using the deciphered first secret key i (step 226). Plaintext is thus obtained.

Twelfth Embodiment

The twelfth embodiment differs from the eleventh embodiment in the types of programs that each of a transmitter 10, a receiver 20 and a server 30 has and an operation performed thereby. Problems for encryption processing performed in the transmitter 10 and decryption processing performed in the receiver 20 are respectively transmitted from a server 30 to the transmitter 10 and the receiver 20. The configuration of a cipher network system in the twelfth embodiment is the same as that in the eleventh embodiment (FIG. 19).

Figure 21:
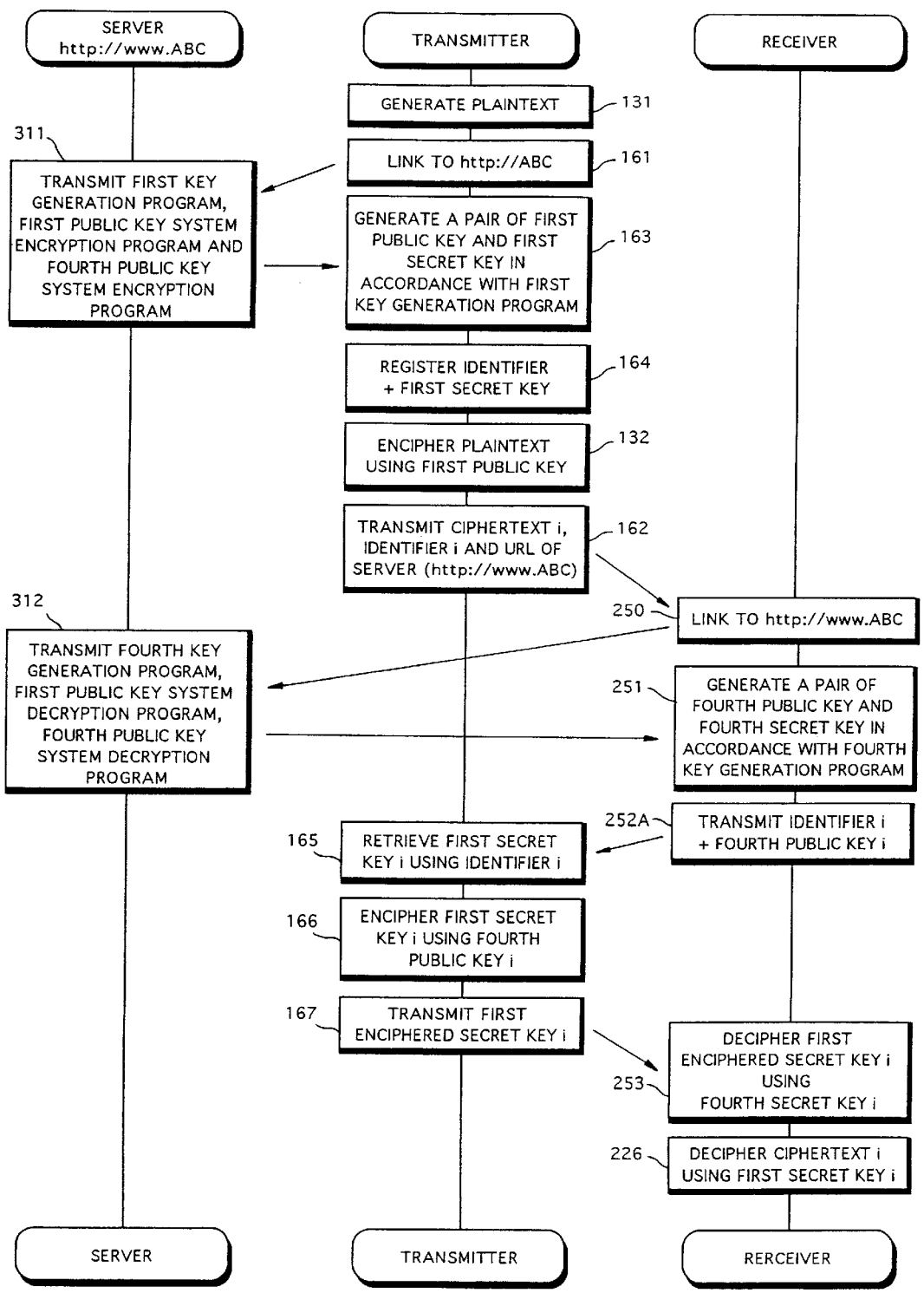
FIG. 21 is a flow chart showing the procedure for encryption processing and decryption processing in a twelfth embodiment.

FIG. 21 is a flow chart showing the procedure for processing in the transmitter 10, the receiver 20 and the server 30 and communication processing among the transmitter 10, the receiver 20 and the server 30. Processing at the steps 131, 161, 132 and 162 in the transmitter 10 and processing at the steps 251, 253 and 226 in the receiver 20 are the same as those in the eleventh embodiment (FIG. 20) and hence, the description thereof is not repeated.

Plaintext is generated in the transmitter 10 (step 131). When URL (http://www.ABC) of the server 30 is entered (step 161), the transmitter 10 is connected to the server 30. A request to transmit the program used in the transmitter 10 is transmitted from the transmitter 10 to the server 30. A first public key/secret key generation program, a first public key system encryption program, and a fourth public key system encryption program are transmitted to the transmitter 10 from the server 30 (step 311).

In the transmitter 10, a pair of the first public key and the first secret key is generated in accordance with the first public key/secret key generation program (step 163). The first secret key i, together with an identifier i, is registered in an external storage device 18 (step 164). On the other hand, the first public key i is used for enciphering plaintext (step 132). Created ciphertext i, together with the identifier i and the URL of the server 30, is transmitted to the receiver 20 (step 162).

The receiver 20 which has received the ciphertext i, the identifier i and the URL of the server 30 is connected to the server 30 using the URL of the server 30 which has been transmitted from the transmitter 10 (step 250). A request to transmit a program used in the receiver 20 is transmitted from the receiver 20 to the server 30. A fourth public key/secret key generation program, a first public key system decryption program, and a fourth public key system decryption program are transmitted to the receiver 20 from the server 30 (step 312).

In the receiver 20, a pair of a fourth public key i and a fourth secret key i is generated in accordance with the fourth public key/secret key generation program (step 251). The generated fourth public key i, together with an identifier i, is transmitted to the transmitter 10 (step 252A). The generated fourth secret key i is registered in an external storage device 28 of the receiver 20 in correspondence with the identifier i.

In the transmitter 10 that has received the fourth public key i and the identifier i, the first secret key i corresponding to the identifier i is retrieved (step 165). The retrieved first secret key i is then enciphered using. the fourth public key i in accordance with the fourth public key system encryption program (step 166). The first enciphered secret key i is transmitted from the transmitter 10 to the receiver 20 (step 167). In the receiver 20, processing at the steps 253 and 226 is performed, so that the ciphertext i that has been received is deciphered to obtain plaintext.

Thirteenth Embodiment

In the thirteenth embodiment, an elimination (erasing) program is provided in a server 30. The elimination program is used for eliminating first and fourth public key/secret key generation programs, first and fourth public key system encryption programs, and first and fourth public key system decryption programs from a transmitter 10 and a receiver 20. The elimination program transmitted to the transmitter 10 is taken as a first elimination (erasing) program, and the elimination program transmitted to the receiver 20 is taken as a second elimination (erasing) program (the first elimination program and the second elimination program may, in some cases, be the same).

Figure 22:
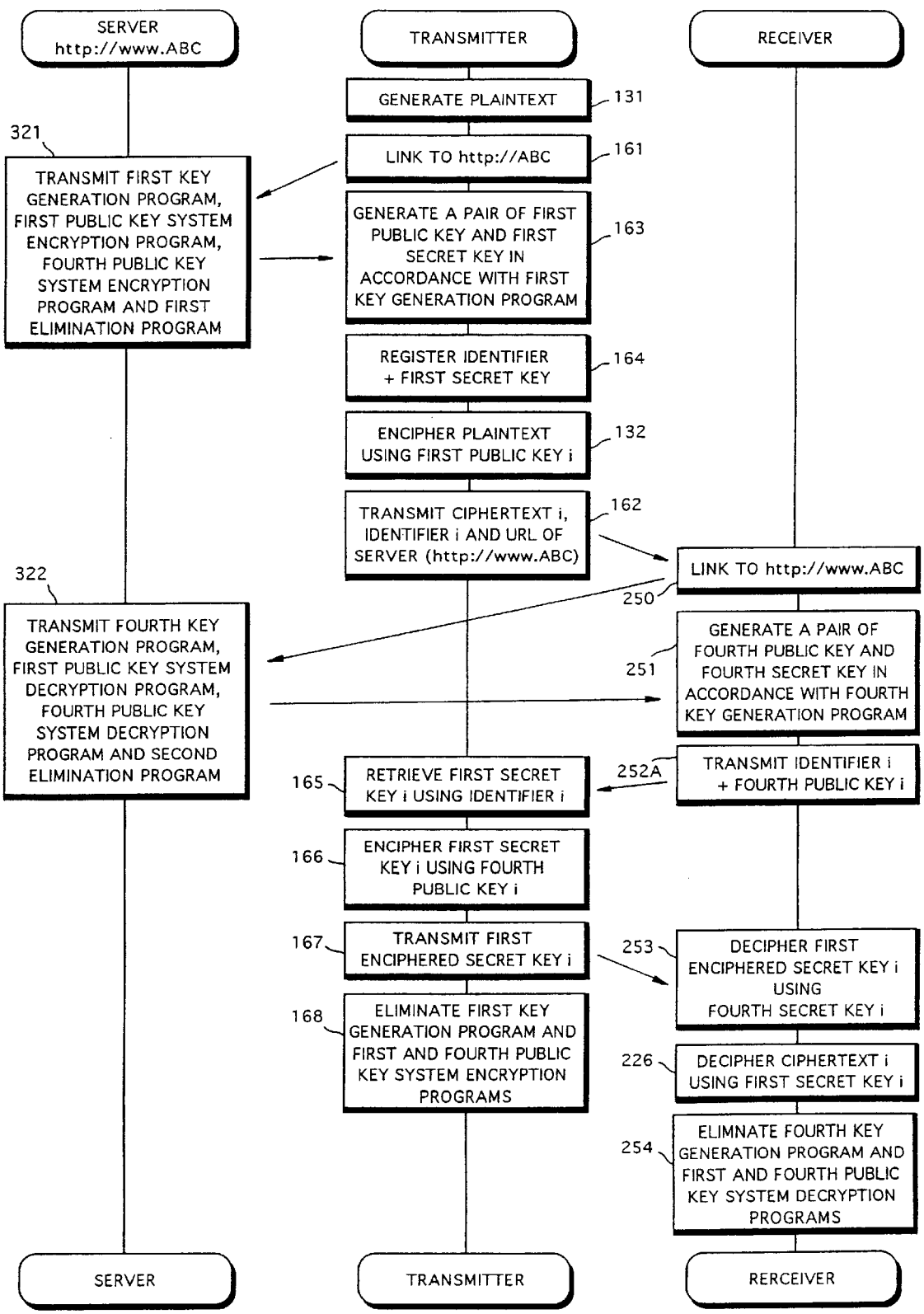
FIG. 22 is a flow chart showing the procedure for encryption processing and decryption processing in a thirteenth embodiment.

FIG. 22 is a flow chart showing the procedure for processing in the transmitter 10, the receiver 20 and the server 30 and communication processing among the transmitter 10, the receiver 20 and the server 30. The other processing is the same as that in the twelfth embodiment (FIG. 21) except that the elimination programs are respectively transmitted from the server 30 to the transmitter 10 and the receiver 20 (steps 321 and 322), and the transmitted elimination programs are respectively executed in the transmitter 10 and the receiver 20 (steps 168 and 254).

The server 30 which has received the request to transmit the program from the transmitter 10 transmits the first elimination program, together with the first public key/secret key generation program and the first public key system encryption program, to the transmitter 10 (step 321). The server 30 which has received the request to transmit the program from the receiver 20 transmits the second elimination program, together with the fourth public key/secret key generation program and the fourth public key system decryption program, to the receiver 20 (step 322).

In the transmitter 10 which has transmitted the first enciphered secret key i to the receiver 20 (step 167), the first elimination program is executed automatically or in response to entry from an operator. The first public key/ secret key generation program and the first and fourth public key system encryption programs are eliminated (step 168).

In the receiver 20 which has deciphered ciphertext (step 226), the second elimination program is executed automatically or in response to entry from an operator. The fourth public key/secret key generation program and the first and fourth public key system decryption programs are eliminated (step 254).

In each of the transmitter 10 and the receiver 20, the programs used for encryption processing or the programs used for decryption program are eliminated, thereby making it possible to prevent the programs from being used by a third person without authorization, and to realize safer encryption communication.

What is claimed is:

1. A method of transmitting ciphertext from a first device to a second device which is connected to the first device by a network, and deciphering the ciphertext in the second device, comprising:

the step of transmitting the ciphertext and an identifier thereof from the first device to the second device;

the step in the second device of generating, in accordance with a first key generation program for generating a pair of a first public key and a first secret key in a first public-key cryptosystem, the pair of the first public key and the first secret key, and holding the generated first secret key in correspondence with the identifier;

the step of transmitting the generated first public key and the identifier from the second device to the first device;

the step in the first device of enciphering information relating to the decryption of the ciphertext using the received first public key, and transmitting the enciphered information and the identifier to the second device; and the step in the second device of deciphering the received enciphered information using the first secret key, which corresponds to the received identifier, of the held first secret keys, and deciphering the ciphertext utilizing the deciphered information.

2. The enciphering method according to claim 1, wherein the information relating to the decryption of the ciphertext is a common key for enciphering plaintext to generate the ciphertext.

3. The enciphering method according to claim 1, wherein the information relating to the decryption of the ciphertext is a secret key for plaintext corresponding to a public key for plaintext for enciphering plaintext to create the ciphertext.

4. The enciphering method according to claim 1, wherein the information relating to the decryption of the ciphertext is a second secret key corresponding to a second public key in a second public-key cryptosystem used for enciphering a common key for enciphering plaintext to create the ciphertext, comprising:

the step of transmitting the common key which has been enciphered by the second public key from the first device to the second device; and the step in the second device of deciphering the received enciphered information using the first secret key to obtain a second secret key, and deciphering using the second secret key the common key enciphered by the second public key.

5. The enciphering method according to claim 1, wherein the information relating to the decryption of the ciphertext is a second secret key corresponding to a second public key in a second public-key cryptosystem used for enciphering a secret key for plaintext corresponding to a public key for plaintext for enciphering plaintext to create said ciphertext, comprising:

the step of transmitting the secret key for plaintext which has been enciphered by the second public key from the first device to the second device; and the step in the second device of deciphering the received enciphered information using the first secret key to obtain a second secret key, and deciphering using the second secret key the secret key for plaintext enciphered by the second public key.

6. The enciphering method according to claim 1, wherein the first key generation program, together with the ciphertext and the identifier, is transmitted from the first device to the second device.

7. The enciphering method according to claim 1, comprising the step of comparing, in the first device, an address assigned to the second device included in transmission data including the first public key and the identifier which are transmitted from the second device to the first device with an address assigned to the second device which is used when the ciphertext is transmitted from the first device to the second device, and transmitting the enciphered information and the identifier from the first device to the second device when the addresses coincide with each other.

8. The enciphering method according to claim 1, wherein at least one of transmission data including the ciphertext, the enciphered information and the identifier which are transmitted from the first device to the second device and the transmission data including the first public key and the identifier which are transmitted from the second device to the first device is transmitted with it being included in a file attached to an electronic mail.

9. The enciphering method according to claim 1, wherein
an instruction to execute the first key generation program is described on a web page provided in the second device, and the second device generates the pair of the first public key and the first secret key in accordance with the instruction to execute the first key generation program when the first device accesses the web page provided in the second device.

10. The enciphering method according to claim 1, wherein a program for enciphering the information relating to the decryption of the ciphertext using the first public key is held in the second device, and the first device accesses said program which is held in the second device.

11. The enciphering method according to claim 1, wherein
an address, in a network, assigned to a file of the second device storing a program for enciphering the information relating to the decryption of the ciphertext using the first public key is described on the web page provided in the second device, and the first device accesses the second device to fetch the web page, and further accesses the address in the network described on the web page to fetch the program.

12. The enciphering method according to claim 1, further comprising the step in the second device of compressing the transmission data including the first public key and the identifier which are transmitted from the second device to the first device, enciphering the compressed transmission data using the first secret key to create an authenticator, and transmitting the authenticator and the transmission data to the first device, and the step in the first device of compressing the transmission data, to check whether or not the compressed transmission data is the same as one which has been obtained by deciphering the authenticator using the first public key.

13. A method in which a first device, a second device and a third device which are connected by a network are capable of communicating with one another, to transmit ciphertext from the first device to the second device, and decipher the ciphertext in the second device, comprising:

the step in the third device of generating a pair of a first public key and a first secret key in a first public key cryptosystem, and holding the generated first secret key and an identifier thereof;

the step of transmitting the first public key and the identifier from the third device to the first device;

the step in the first device of creating the ciphertext using the received first public key to transmit the ciphertext and the identifier thereof to the second device;

the step in the second device of generating, in accordance with a second key generation program for generating a pair of a second public key and a second secret key in a second public-key cryptosystem, the second public key and the second secret key, and transmitting the generated second public key and the identifier to the third device;

the step in the third device of enciphering the first secret key, which corresponds to the received identifier, of the held first secret keys using the received second public key, and transmitting the enciphered first secret key and the identifier from the third device to the second device; and the step in the second device of deciphering the received enciphered first secret key using the second secret key corresponding to the received identifier, and deciphering the ciphertext using the deciphered first secret key.

14. A method in which a first device, a second device and a third device which are connected by a network are capable of communicating with one another, to transmit ciphertext from the first device to the second device, and decipher the ciphertext in the second device, comprising:

the step of transmitting a first key generation program for generating a pair of a first public key and a first secret key in a first public-key cryptosystem from the third device to the first device in response to a request from the first device;

the step in said first device of generating the pair of the first public key and the first secret key in accordance with said received first key generation program, holding the generated first secret key and an identifier thereof, creating the ciphertext using the first public key, and transmitting the ciphertext and the identifier to the second device, the step of transmitting a second key generation program for generating a pair of a second public key and a second secret key in a second public-key cryptosystem from the third device to the second device in response to a request from the second device;

the step in the second device of generating the pair of the second public key and the second secret key in accordance with the received second key generation program, and holding the generated second secret key in correspondence with the identifier transmitted from the first device;

the step of transmitting the generated second public key and the identifier from the second device to the first device;

the step in the first device of enciphering the first secret key, which corresponds to the received identifier, of the held first secret keys using the transmitted second public key, and transmitting the enciphered first secret key, together with the identifier, to the second device; and the step in the second device of deciphering the received enciphered first secret key using the second secret key corresponding to the received identifier, and deciphering the ciphertext using the deciphered first secret key.

15. The enciphering method according to claim 13, further comprising the step of transmitting, together with the program for encryption or decryption which is transmitted from the third device to the first device and the second device, a program for eliminating the programs, and eliminating the key generation program or the program for encryption or decryption by the program for elimination, after performing encryption processing and decryption processing in the first device and the second device.

16. A method of transmitting ciphertext from a first device to a second device which is connected to the first device by a network, and deciphering the ciphertext in the second device, comprising:

the step of transmitting a key generation program for generating a pair of a public key and a secret key in a public-key cryptosystem, together with an identifier, from the first device to the second device;

the step in the second device of generating the pair of the public key and the secret key in accordance with the received key generation program, holding the generated secret key in correspondence with the identifier, and transmitting the generated public key, together with the identifier, to the first device;

the step in the first device of generating enciphered information using the received public key, to transmit the generated enciphered information, together with the identifier, to the second device; and the step in the second device of deciphering the received enciphered information using the secret key, which corresponds to the received identifier, of the held secret keys.

17. The enciphering method according to claim 16, wherein the enciphered information is ciphertext obtained by enciphering plaintext using the public key.

18. The enciphering method according to claim 16, wherein the enciphered information is an enciphered key obtained by enciphering a common key used for creating the ciphertext using the public key, and the first device transmits the key generation program, together with the created ciphertext, to the second device.

19. A first device, in a cipher network system, connected to a second device by a network for transmitting to the second device ciphertext to be deciphered in the second device, comprising:

first transmitting means for transmitting the ciphertext and an identifier thereof to the second device;

receiving means for receiving, in a pair of a first public key and a first secret key in a first public key cryptosystem which have been generated in the second device, the first public key and the identifier thereof from the second device;

enciphering means for enciphering information relating to the decryption of the ciphertext using the received first public key; and second transmitting means for transmitting the enciphered information and the identifier to the second device.

20. The first device in the cipher network system according to claim 19, further comprising third transmitting means for transmitting to the second device a first key generation program for generating the pair of the first public key and the first secret key in the first public-key cryptosystem.

21. A second device, in a cipher network system, connected to a first device by a network for deciphering ciphertext transmitted from the first device, comprising:

first receiving means for receiving the ciphertext transmitted from the first device and the identifier;

key generating means for generating, in accordance with a first key generation program for generating a pair of a first public key and a first secret key in a first public key cryptosystem, the pair of the first public key and the first secret key;

holding means for holding the generated first secret key and the identifier thereof;

first transmitting means for transmitting the generated first public key and the identifier to the first device;

second receiving means for receiving information relating to the decryption of the ciphertext which has been enciphered using the first public key in the first device and the identifier;

first deciphering means for deciphering the received enciphered information using the first secret key, which corresponds to the received identifier, of the held first secret keys; and second deciphering means for deciphering the ciphertext utilizing the deciphered information.

22. The second device according to claim 21, further comprising second transmitting means for transmitting to the first device an encryption program for enciphering plaintext in the first device to generate the ciphertext and a public key system encryption program for enciphering the information relating to the decryption of the ciphertext using the first public key in the first device.

23. A first device, in a cipher network system, connected to a second device by a network for transmitting to the second device enciphered information to be deciphered in the second device, comprising:

first transmitting means for transmitting to the second device a key generation program for generating a pair of a public key and a secret key in a public-key cryptosystem, together with an identifier;

receiving means for receiving from the second device the public key in the pair of the public key and the secret key which have been generated in accordance with the key generation program in the second device, together with the identifier; and second transmitting means for generating enciphered information using the received public key, to transmit the generated enciphered information, together with the identifier, to the second device.

24. A second device, in a cipher network system, connected to a first device by a network for deciphering enciphered information transmitted from the first device, comprising:

first receiving means for receiving a key generation program for generating a pair of a public key and a secret key in a public-key cryptosystem, together with an identifier, from the first device;

means for generating the pair of the public key and the secret key in accordance with the received key generation program, and holding the generated secret key in correspondence with the identifier;

transmitting means for transmitting the generated public key, together with the identifier, to the first device;

second receiving means for receiving the enciphered information generated using the public key in the first device, together with the identifier; and means for deciphering the received enciphered information using the secret key, which corresponds to the received identifier, of the held secret keys.

25. A computer readable recording medium storing a program for controlling a first device connected to a second device by a network for transmitting to the second device ciphertext to be deciphered in the second device, so as to transmit the ciphertext and an identifier thereof to the second device;

receive, in a pair of a first public key and a first secret key in a first public-key cryptosystem which have been generated in the second device, the first public key and the identifier from the second device;

encipher information relating to the decryption of the ciphertext using the received first public key; and transmit the enciphered information and the identifier to the second device.

26. A computer readable recording medium storing a program for controlling a second device connected to a first device by a network for deciphering ciphertext transmitted from the first device, so as to receive the ciphertext transmitted from the first device and an identifier thereof;

generate a pair of a first public key and a first secret key in a first public-key cryptosystem;

hold the generated first secret key and the identifier, and transmit the generated first public key and the identifier to the first device;

receive information relating to the decryption of the ciphertext enciphered using the first public key in the first device and the identifier;

decipher the received enciphered information using the first secret key, which corresponds to the received identifier, of the held first secret keys; and decipher the ciphertext utilizing the deciphered information.

27. The computer readable recording medium according to claim 26, further storing an encryption program for enciphering, in the first device, plaintext to create the ciphertext, and a public key system encryption program for enciphering, in the first device, the information relating to the decryption of the ciphertext using the first public key.

28. A computer readable recording medium storing a program for controlling a first device connected to a second device by a network for transmitting to the second device enciphered information to be deciphered in the second device, so as to transmit a key generation program for generating a pair of a public key and a secret key in a public-key cryptosystem, together with an identifier, to the second device;

receive the public key transmitted from the second device in the pair of the public key and the secret key which have been generated in accordance with the key generation program, together with the identifier;

create the enciphered information using the received public key; and transmit the created enciphered information together with the identifier.

29. A computer readable recording medium storing a program for controlling a second device connected to a first device by a network for deciphering enciphered information transmitted from the first device, so as to receive a key generation program for generating a pair of a public key and a secret key in a public-key cryptosystem and an identifier which are transmitted from the first device;

generate the pair of the public key and the secret key in accordance with the received key generation program;

hold the generated secret key in correspondence with the identifier;

transmit the generated public key, together with the identifier, to the first device;

receive enciphered information which has been generated using the public key in the first device and the identifier, which are sent from the first device; and decipher the received enciphered information using the secret key, which corresponds to the received identifier, of the held secret keys.

30. The enciphering method according to claim 14, further comprising the step of transmitting, together with the program for encryption or decryption which is transmitted from the third device to the first device and the second device, a program for eliminating the programs, and eliminating the key generation program or the program for encryption or decryption by the program for elimination, after performing encryption processing and decryption processing in the first device and the second device.

* * * * *